US006377229B1

(12) United States Patent
Sullivan

(10) Patent No.: US 6,377,229 B1
(45) Date of Patent: Apr. 23, 2002

(54) MULTI-PLANAR VOLUMETRIC DISPLAY SYSTEM AND METHOD OF OPERATION USING THREE-DIMENSIONAL ANTI-ALIASING

(75) Inventor: Alan Sullivan, White Plains, NY (US)

(73) Assignee: Dimensional Media Associates, Inc., New York, NY (US)

( * ) Notice: Subject to any disclaimer, the term of this patent is extended or adjusted under 35 U.S.C. 154(b) by 0 days.

(21) Appl. No.: 09/291,315

(22) Filed: Apr. 14, 1999

Related U.S. Application Data

(63) Continuation-in-part of application No. 09/196,553, filed on Nov. 20, 1998.
(60) Provisional application No. 60/082,442, filed on Apr. 20, 1998.

(51) Int. Cl.[7] .................................................. G09G 5/00
(52) U.S. Cl. ............................ 345/6; 345/424; 359/462
(58) Field of Search ................................. 345/4–6, 419, 345/422, 424, 427, 431, 433, 439, 434, 136, 137, 7–9, 611, 614; 348/744; 359/443, 462

(56) References Cited

U.S. PATENT DOCUMENTS 2,961,486 A * 11/1960 Marks ........................... 348/42
3,555,349 A * 1/1971 Munz ........................... 315/383
5,387,920 A * 2/1995 Bos et al. ....................... 345/88
5,572,375 A * 11/1996 Crabtree, IV ............... 359/858
5,847,711 A * 12/1998 Kaufman et al. ........... 345/424
5,886,818 A * 3/1999 Summer et al. ............. 359/478
5,929,862 A * 7/1999 Barkans ....................... 345/431
6,016,151 A * 1/2000 Lin ............................... 345/430
6,100,862 A * 8/2000 Sullivan ......................... 345/88

* cited by examiner

Primary Examiner—Richard Hjerpe
Assistant Examiner—Alexander Eisen
(74) Attorney, Agent, or Firm—Amster, Rothstein & Ebenstein

(57) ABSTRACT

A multi-planar volumetric display system and method of operation generate volumetric three-dimensional images using a multi-surface optical device including a plurality of individual optical elements arranged in an array; an image projector for selectively projecting images on respective optical elements to generate a first volumetric three-dimensional image viewable in the multi-surface optical device; and a floating-image generator for projecting the first volumetric three-dimensional image to generate a second volumetric three-dimensional image viewable as floating in space at a location separate from the multi-surface optical device. Anti-aliasing adjusts the display of voxels in a transition between optical elements, such that color values of the voxels are modified as a function of the distance of the voxels from the optical elements, to generate a smooth transition between portions of the volumetric three-dimensional image.

38 Claims, 12 Drawing Sheets

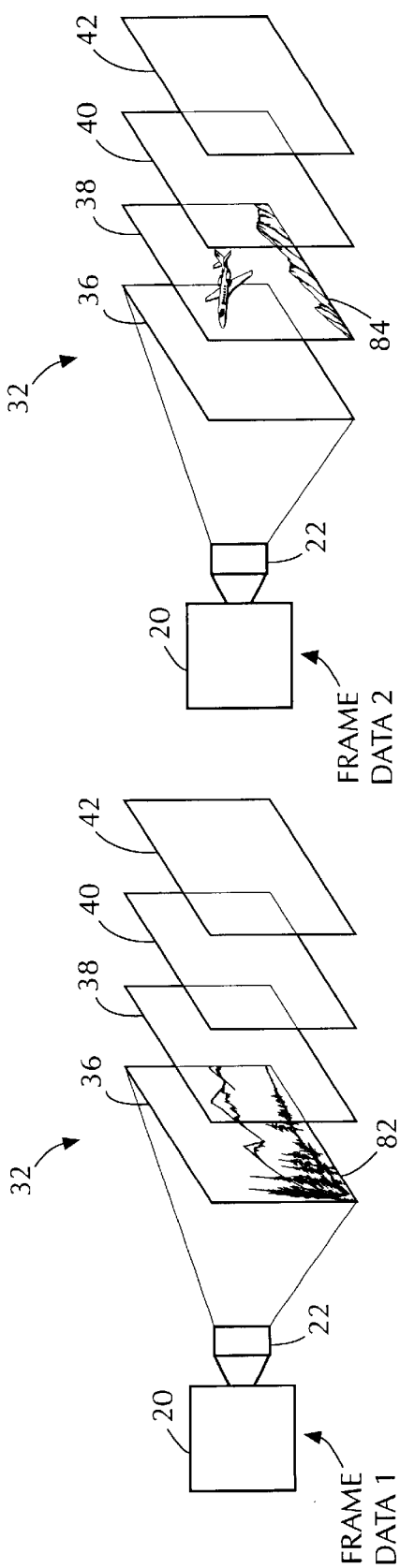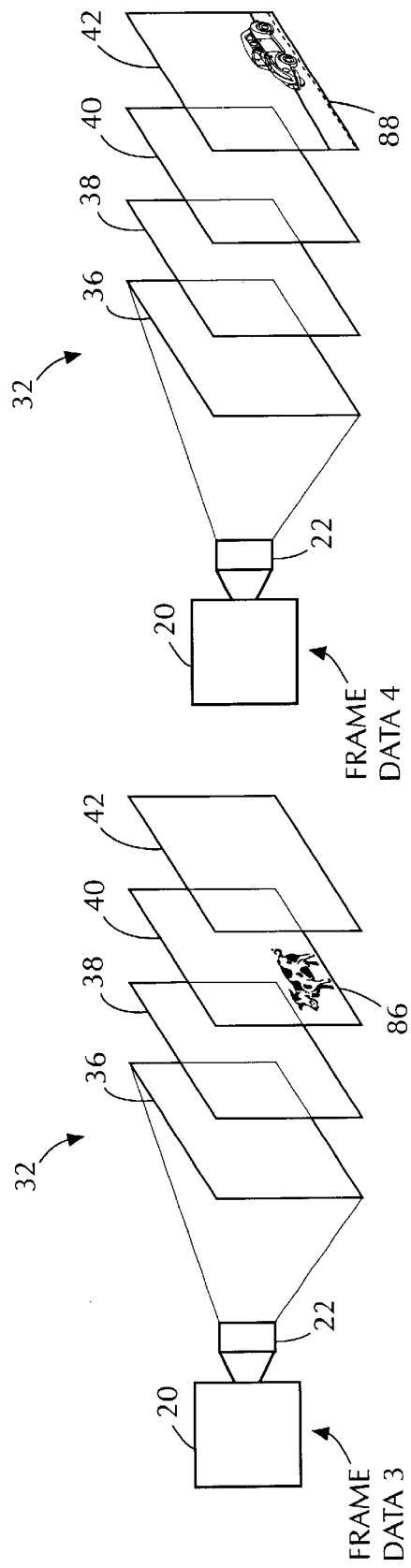

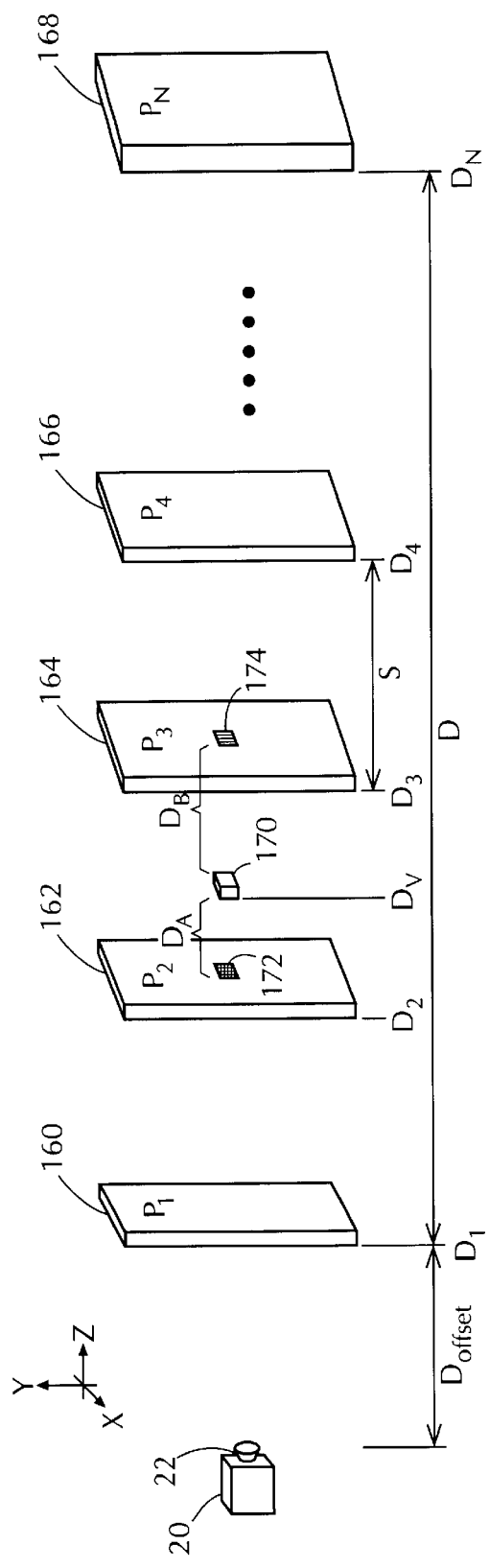
FIG. 16
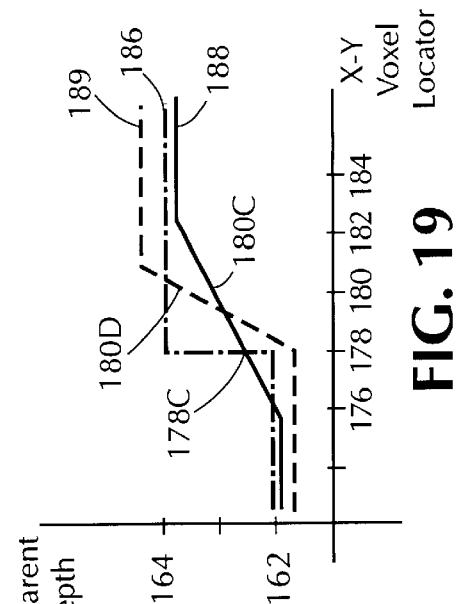
FIG. 19
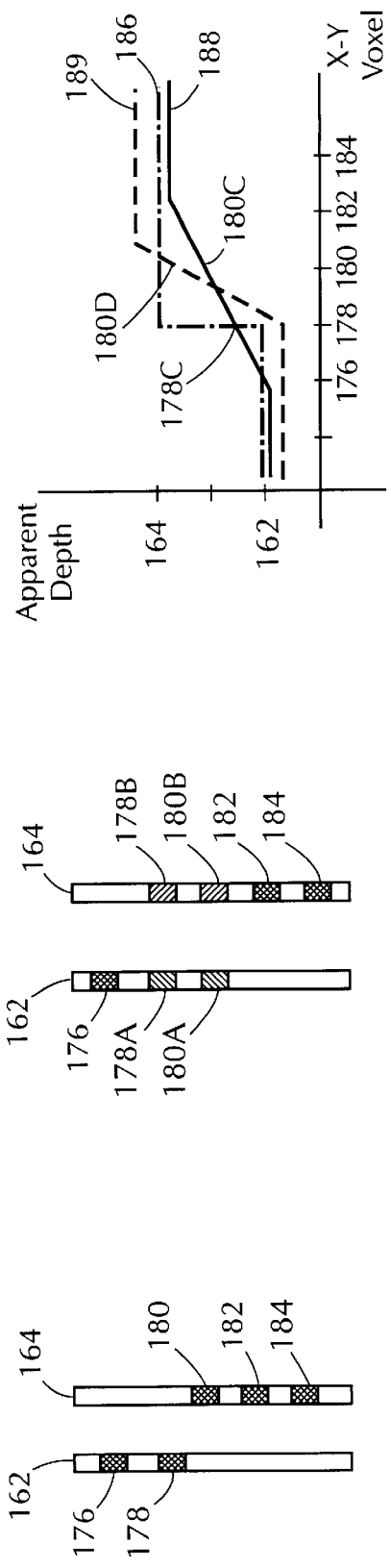
FIG. 18
FIG. 17

US 6,377,229 B1

MULTI-PLANAR VOLUMETRIC DISPLAY SYSTEM AND METHOD OF OPERATION USING THREE-DIMENSIONAL ANTI-ALIASING

CROSS-REFERENCE TO RELATED APPLICATIONS

This application is related to co-pending U.S. provisional patent appln. Ser. No. 60/082,442, filed Apr. 20, 1998. This application is also a continuation-in-part of co-pending U.S. patent application Ser. No. 09/196,553, filed Nov. 20, 1998. This application is also related to co-pending U.S. patent application Ser. No. 08/743,483, filed Nov. 4, 1996, which is a continuation-in-part of U.S. patent application Ser. No. 08/152,861, filed Nov. 15, 1993 (now U.S. Pat. No. 5,572, 375); which is a continuation-in-part of U.S. patent application Ser. No. 07/840,316, filed Feb. 24, 1992 (now U.S. Pat. No. 5,311,335, issued May 10, 1994); which is a division of U.S. patent application Ser. No. 07/562,271, filed Aug. 3, 1990 (now U.S. Pat. No. 5,090,789, issued Feb. 25, 1992). This application is also related to co-pending U.S. patent application Ser. No. 09/004,722, filed Jan. 8, 1998.

BACKGROUND OF THE INVENTION

The present invention relates to three-dimensional (3D) imaging, and, more particularly, to a multi-planar display system using 3D anti-aliasing for generating volumetric three-dimensional images in space.

It is known that three-dimensional (3D) images may be generated and viewed to appear in space. Typically, specialized eyewear such as goggles and/or helmets are used, but such eyewear can be encumbering. In addition, by its nature as an accessory to the eyes, such eyewear reduces the perception of viewing an actual 3D image. Also, the use of such eyewear can cause eye fatigue which is remedied by limiting the time to view the image, and such eyewear is often bulky and uncomfortable to wear.

Thus, there is a need to generate volumetric 3D images and displays without the disadvantages of using such eyewear.

Other volumetric systems generate such volumetric 3D images using, for example, self-luminescent volume elements, that is, voxels. One example is the system of 3D Technology Laboratories of Mountain View, Calif., in which the intersection of infrared laser beams in a solid glass or plastic volume doped with rare earth impurity ions generates such voxel-based images. However, the non-linear effect that creates visible light from two invisible infrared laser beams has a very low efficiency of about 1%, which results in the need for powerful lasers to create a bright image in a large display. Such powerful lasers are a potential eye hazard requiring a significant protective enclosure around the display. Additionally, scanned lasers typically have poor resolution resulting in low voxel count, and the solid nature of the volumetric mechanism results in large massive systems that are very heavy.

Another volumetric display system from Actuality Systems, Inc. of Cambridge, Mass., uses a linear array of laser diodes that are reflected off of a rapidly spinning multifaceted mirror onto a rapidly spinning projection screen. However, such rapidly spinning components, which may be relatively large in size, must be carefully balanced to avoid vibration and possibly catastrophic failure. Additionally, the size, shape, and orientation of voxels within the display depends on their location, resulting in a position-dependent display resolution.

Another volumetric display system is provided by Neos Technologies, Inc., of Melbourne, Fla., which scans a laser beam acousto-optically onto a rapidly spinning helical projection screen. Such a large spinning component requires a carefully maintained balance independent of display motion. The laser scanner system has poor resolution and low speed, drastically limiting the number of voxels. Additionally, the size, shape, and orientation of voxels within the display depends on their location, resulting in a position dependent display resolution. Finally, the dramatically non-rectilinear nature of the display greatly increases the processing requirements to calculate the different two-dimensional images.

Other types of 3D imaging system are known, such as stereoscopic displays, which provide each eye with a slightly different perspective view of a scene. The brain then fuses the separate images into a single 3D image. Some systems provide only a single viewpoint and require special eyewear, or may perform headtracking to eliminate eyewear but then the 3D image can be seen by only a single viewer. Alternatively, the display may provide a multitude of viewing zones at different angles with the image in each zone appropriate to that point of view, such as multi-view autostereoscopic displays. The eyes of the user must be within separate but adjacent viewing zones to see a 3D image, and the viewing zone must be very narrow to prevent a disconcerting jumpiness as the viewer moves relative to the display. Some systems have only horizontal parallax/lookaround. In addition, depth focusing-convergence disparity can rapidly lead to eyestrain that strongly limits viewing time. Additionally, stereoscopic displays have a limited field of view and cannot be used realistically with direct interaction technologies such as virtual reality and/or a force feedback interface.

Headmounted displays (HMD) are typically employed in virtual reality applications, in which a pair of video displays present appropriate perspective views to each eye. A single HMD can only used by one person at a time, and provide each eye with a limited field of view. Headtracking must be used to provide parallax.

Other display systems include holographic displays, in which the image is created through the interaction of coherent laser light with a pattern of very fine lines known as a holographic grating. The grating alters the direction and intensity of the incident light so that it appear to come from the location of the objects being displayed. However, a typical optical hologram contains an enormous amount of information, so updating a holographic display at high rates is computationally intensive. For a holographic display having a relatively large size and sufficient field of view, the pixel count is generally greater than 250 million.

Accordingly, a need exists for high quality volumetric 3D imaging with computationally acceptable demands on processing systems and which has improved viewability and implementation.

In addition, in three-dimensional imaging, the use of discrete voxels renders portions of images to appear jagged due to pixelization, for example, for features at transitions between discrete depths in a volumetric 3D image. A need exists for a method which softens the transition between portions of a volumetric 3D image.

SUMMARY OF THE INVENTION

A multi-planar volumetric display (MVD) system and method of operation are disclosed which generate volumetric three-dimensional images. The MVD system includes a multi-surface optical device including a plurality of individual optical elements arranged in an array; an image projector for selectively projecting a set of images on respective optical elements of the multi-surface optical device to generate a first volumetric three-dimensional image viewable in the multi-surface optical device; and a floating-image generator for projecting the first volumetric three-dimensional image from the multi-surface optical device to generate a second volumetric three-dimensional image viewable as floating in space at a location separate from the multi-surface optical device.

Each of the plurality of individual optical elements of the multi-surface optical device includes a liquid crystal element having a controllable variable translucency. An optical element controller is also provided for controlling the translucency of the liquid crystal elements, such that a single liquid crystal element is controlled to have an opaque light-scattering state to receive and display the respective one of the set of images from the image projector; and the remaining liquid crystal elements are controlled to be substantially transparent to allow the viewing of the displayed image on the opaque liquid crystal element.

The optical element controller rasters through the liquid crystal elements at a high rate during a plurality of imaging cycles to select one liquid crystal element therefrom to be in the opaque light-scattering state during a particular imaging cycle, and to cause the opaque light-scattering state to move through the liquid crystal elements for successively receiving the set of images and for generating the volumetric three-dimensional images with three-dimensional depth.

The image projector projects the set of images into the multi-surface optical device to generate the entire first volumetric three-dimensional image in the multi-surface optical device at a rate greater than 35 Hz to prevent human-perceivable image flicker. For example, the volume rate may be about 40 Hz. In one embodiment, for example, if about 50 optical elements are used with a volume rate of about 40 Hz, the image projector projects each of the set of images onto a respective optical element at a rate of 2 kHz.

The image projector includes a projection lens for outputting the set of images. The projector also includes an adaptive optical focusing system for focusing each of the set of images on the respective optical elements to control the resolution and depth of the projection of the set of images from the projection lens. Alternatively or in addition, the image projector includes a plurality of laser light sources for projecting red, green, and blue laser light, respectively, to generate and project the set of images in a plurality of colors.

In addition, a 3D anti-aliasing method is employed to smooth the portions of the projected images at transitions between optical elements in the multi-surfaced optical device. The anti-aliasing adjusts the display of voxels in a transition between optical elements, such that color values of the voxels are modified as a function of the distance of the voxels from the optical elements, to generate a smooth transition between portions of the volumetric three-dimensional image.

BRIEF DESCRIPTION OF THE DRAWINGS

FIGS. 4–7 illustrate successive displays of images on multiple optical elements to form a volumetric 3D image;

FIG. 16 illustrates 3D anti-aliasing of a voxel in a plurality of optical elements;

FIG. 17 illustrates voxel display without 3D anti-aliasing;

FIG. 18 illustrates voxel display with 3D anti-aliasing;

FIG. 19 illustrates a graph comparing apparent depth with and without 3D anti-aliasing;

DETAILED DESCRIPTION OF THE PREFERRED EMBODIMENTS

Figure 1:
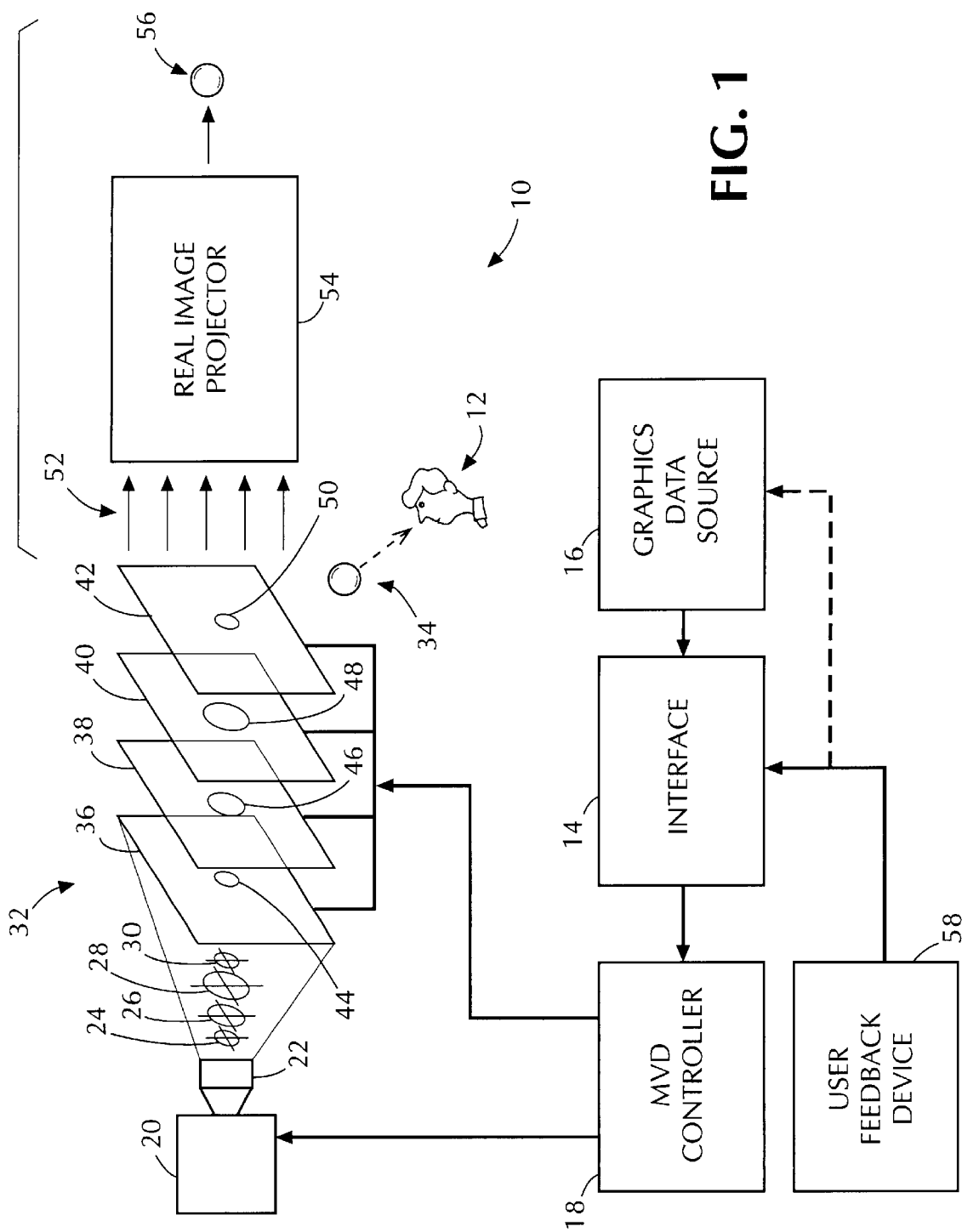
FIG. 1 illustrates the disclosed multi-planar volumetric display system.

Referring now to FIG. 1, a multi-planar volumetric display system 10 is provided which generates three-dimensional (3D) images which are volumetric in nature, that is, the 3D images occupy a definite and limited volume of 3D space, and so exist at the location where the images appear. Thus, such 3D images are true 3D, as opposed to an image perceived to be 3D due to an optical illusion of vision such as by stereographic methods.

The 3D images generated by the system 10 can have a very high resolution and can be displayed in a large range of colors, and so can have the characteristics associated with viewing a real object. For example, such 3D images may have both horizontal and vertical motion parallax or lookaround, allowing the viewer 12 to move yet still receive visual cues to maintain the 3D appearance of the 3D images.

In addition, a viewer 12 does not need to wear any special eyewear such as stereographic visors or glasses to view the 3D image, which is advantageous since such eyewear is encumbering, causes eye fatigue, etc. Furthermore, the 3D image has a continuous field of view both horizontally and vertically, with the horizontal field of view equal to 360° in certain display configurations. Additionally, the viewer can be at any arbitrary viewing distance from the MVD system 10 without loss of 3D perception.

The multi-planar volumetric display system 10 includes an interface 14 for receiving 3D graphics data from a graphics data source 16, such as a computer which may be incorporated into the system 10, or which may be operatively connected to the system 10 through communications channels from, for example, a remote location and connected over conventional telecommunications links or over any network such as the Internet. The interface 14 may be a PCI bus, or an accelerated graphics port (AGP) interface available from INTEL of Santa Clara, Calif. Other interfaces may be used, such as the VME backplane interconnection bus system standardized as the IEEE 1014 standard, the Small Computer System Interface (SCSI), the NuBus high-performance expansion bus system used in Apple Macintosh computers and other systems, as well as the Industry Standard Architecture (ISA) interface, the Extended ISA (EISA) interface, the Universal Serial Bus (USB) interface, the FireWire bus interface now standardized as the IEEE 1394 standard offering high-speed communications and isochronous real-time data services in computers, as well as open or proprietary interfaces.

The interface 14 passes the 3D graphics data to a multi-planar volumetric display (MVD) controller 18, which includes a large high speed image buffer. The three-dimensional image to be viewed as a volumetric 3D image is converted by the MVD controller 18 into a series of two-dimensional image slices at varying depths through the 3D image. The frame data corresponding to the image slices are then rapidly output from the high speed image buffer of the MVD controller 18 to an image projector 20.

The MVD controller 18 and the interface 14 may be implemented in a computer, such as an OCTANE graphics workstation commercially available from SILICON GRAPHICS of Mountain View, Calif. Other general computer-based systems may also be used, such as a personal computer (PC) using, for example, a 195 MHz reduced instruction set computing (RISC) microprocessor. Accordingly, it is to be understood that the disclosed MVD system 10 and its components are not limited to a particular implementation or realization of hardware and/or software.

The graphics data source 16 may optionally be a graphics application program of a computer which operates an application program interface (API) and a device driver for providing the 3D image data in an appropriate format to the MVD controller 18 of the computer through an input/output (I/O) device such as the interface 14. The MVD controller 18 may be hardware and/or software, for example, implemented in a personal computer and optionally using expansion cards for specialized data processing.

For example, an expansion card in the MVD controller 18 may include graphics hardware and/or software for converting the 3D dataset from the graphics data source 16 into the series of two-dimensional image slices forming a multi-planar dataset corresponding to the slices 24–30. Thus the 3D image 34 is generated at real-time or near-real-time update rates for real world applications such as surgical simulation, air traffic control, or military command and control. Such expansion cards may also include a geometry engine for manipulating 3D datasets and texture memory for doing texture mapping of the 3D images.

Prior to transmission of the image data to the image projector 20, the MVD controller 18 or alternatively the graphics data source 16 may perform 3D anti-aliasing on the image data to smooth the features to be displayed in the 3D image 34, and so to avoid any jagged lines in depth, for example, between parallel planes along the z-direction, due to display pixelization caused by the inherently discrete voxel construction of the MOE device 32 with the optical elements 36–42 aligned in x-y planes normal to a z-axis. As the data corresponding to the image slices 24–30 is generated, an image element may appear near an edge of a plane transition, that is, between optical elements, for example, the optical elements 36–38. To avoid an abrupt transition at the specific image element, both of slices 24, 26 may be generated such that each of the images 44–46 includes the specific image element, and so the image element is shared between both planes formed by the optical elements 36–38, which softens the transition and allows the 3D image 34 to appear more continuous. The brightness of the image elements on respective consecutive optical elements is varied in accordance with the location of the image element in the image data.

The graphics data source 16 and the MVD controller 18 may also perform zero-run encoding through the interface 14 in order to maximize the rate of transfer of image data to the MVD controller 18 for image generation. It is to be understood that other techniques for transferring the image data may be employed, such as the Motion Picture Experts Group (MPEG) data communication standards as well as delta ($\Delta$) compression.

A 3D image may contain on the order of 50 SVGA resolution images updated at a rate of 40 Hz, which results in a raw data rate of more than 2 GB/sec. to be displayed. Such a raw data rate can be significantly reduced by not transmitting zeros. A volumetric 3D image is typically represented by a large number of zeros associated with the inside of objects, background objects obstructed by foreground objects, and surrounding empty space. The graphics data source 16 may encode the image data such that a run of zeroes is represented by a zero-run flag (ZRF) or zero-run code, and followed by or associated with a run length. Thus, the count of the zeros may be sent for display without sending the zeroes. A 3D data image buffer in the MVD controller 18 may be initialized to store all zeroes, and then as the image data is stored in the image buffer, a detection of the ZRF flag causes the MVD controller 18 to jump ahead in the buffer by the number of data positions or pixels equal to the run length of zeroes. The 3D data image buffer then contains the 3D data to be output to the image projector 20, which may include an SLM driver for operating an SLM to generate the two-dimensional images.

The image projector 20 has associated optics 22 for projecting the two-dimensional slices 24–30 of the 3D image at a high frame rate and in a time-sequential manner to a multiple optical element (MOE) device 32 for selective imaging to generate a first volumetric three-dimensional image 34 which appears to the viewer 12 to be present in the space of the MOE device 32. The MOE device 32 includes a plurality of optical elements 36–42 which, under the control of the MVD controller 18, selectively receive each of the slices 24–30 as displayed two-dimensional images 44–50, with one optical element receiving and displaying a respective slice during each frame rate cycle. The number of depth slices generated by the MVD controller 18 is to be equal to the number of optical elements 36–42, that is, each optical element represents a unit of depth resolution of the volumetric 3D image to be generated and displayed.

The optical elements 36–42 may be liquid crystal displays composed of, for example, nematic, ferroelectric, or cholesteric materials, or other polymer stabilized materials, such as cholesteric textures using a modified Kent State formula known in the art for such compositions.

The overall display of each of the slices 24–30 by the optical elements 36–42 of the MOE device 32, as a set of displayed images, occurs at a sufficiently high frame rate as set forth below, such as rates greater than about 35 Hz so that the human viewer 12 perceives a continuous volumetric 3D image 34, viewed directly and without a stereographic headset, and instead of the individual two-dimensional images 44–50. Accordingly, in the illustration of FIG. 1, the images 44–50 may be cross-sections of a sphere, and so the 3D image 34 thus generated which would appear as a sphere to the viewer 12 positioned in the midst of the optical elements 36–42 forming the MOE device 32.

In alternative embodiments, the images 44–50 may be generated to display an overall image having a mixed 2D and 3D appearance, such as 2D text as a caption below the sphere, or 2D text on the sphere. One application may be a graphic user interface (GUI) control pad which has both 2D and 3D image characteristics to allow the viewer 12 to view a GUI, such as MICROSOFT WINDOWS 95, with 2D screen appearances as a virtual flat screen display, and with 3D images such as the sphere appearing on a virtual flat screen display.

The first volumetric 3D image 34 is viewable within a range of orientations. Furthermore, light 52 from the first volumetric 3D image 34 is further processed by a real image projector 54 to generate a second volumetric 3D image 56 which appears to the viewer 12 to be substantially the same image as the first volumetric 3D image 34 floating in space at a distance from the MOE device 32. The real image projector 54, or alternatively a floating image projector, may be a set of optics and/or mirrors for collecting light 52 emitted from the MOE device 32 and for re-imaging the 3D image 34 out into free space. The real image projector 54 may be a high definition volumetric display (HDVD) which includes a conventional spherical or parabolic mirror to produce a signal viewing zone located on an optic axis of the MOE device 32.

For example, the real image projection systems may be the apparatus described in U.S. Pat. No. 5,552,934 to Prince and U.S. Pat. No. 5,572,375 to Crabtree, IV, each of these patents being incorporated herein by reference. In alternative embodiments, holographic optics may be employed by the real image projector 54 with the same functions as conventional spherical or parabolic mirrors to generate a floating image 56 but with multiple viewing zones, such as one viewing zone in a center area aligned with the optic axis, and viewing zones on either side of an optical axis, so multiple 3D floating images 56 may be viewed by multiple viewers.

In other alternative embodiments, the real image projector 54 may include holographic optical elements (HOEs), that is, holograms in the conventional sense which do not show a recorded image of a pre-existing object. Instead, an HOE acts as a conventional optical element such as a lens and/or mirror to receive, reflect, and re-direct incident light. Compared to conventional optical elements such as glass or plastic, HOEs are very lightweight and inexpensive to reproduce, and may also possess unique optical characteristics not available in conventional optics. For example, an HOE can produce multiple images of the same object at different angles from a predetermined optical axis, and so the field of view of a display employing a relatively small HOE can be dramatically increased without increasing the optic size as required for conventional optics. Accordingly, using at least one HOE as the real image projector 54, the MVD system 10 may be fabricated to provide a relatively compact system with a 360° field of view. In addition, for an image projector 20 incorporating laser light sources, HOEs are especially compatible for high performance with such laser light sources due to the wavelength selectivity of the HOE.

Since either of the volumetric 3D images 34, 56 appears to the viewer 12 to have volume and depth, and optionally also color, the multi-planar volumetric display system 10 may be adapted for virtual reality and haptic/tactile applications, such as the example described below for tactile animation to teach surgery. The real image projector 54 allows the floating 3D image 56 to be directly accessible for virtual interaction. The MVD system 10 may include a user feedback device 58 for receiving hand movements from the viewer 12 corresponding to the viewer 12 attempting to manipulate either of the images 34, 56. Such hand movements may be translated by the user feedback device 58 as control signals which are conveyed to the interface 14 to the MVD controller 18 to modify one or both of the images 34, 56 to appear to respond to the movements of the viewer 12. Alternatively, the user feedback device 58 may be operatively connected to the graphics data source 16, which may include a 3D graphics processor, to modify one or both of the images 34, 56.

A number of new interaction technologies provide improved performance of the MVD 10 using the real image projector 54. For example, a force feedback interface developed by SENSIBLE DEVICES, INC. of Cambridge, Massachusetts, is a powerful enabling technology which allows the MVD system 10 to provide the ability to actually feel and manipulate the 3D images 34, 56 by hand. With appropriate programming, the viewer 12 can sculpt three-dimensional images as if the images were clay, using a system called DIGITAL CLAY, a commercial product of DIMENSIONAL MEDIA ASSOCIATES, the assignee of the present application.

Another application of an MVD system 10 with a force feedback interface is a surgical simulator and trainer, in which the user can see and feel three-dimensional virtual anatomy, including animation such as a virtual heart beating and reacting to virtual prodding by a user, in order to obtain certification as a surgeon, to practice innovative new procedures, or even to perform a remote surgery, for example, over the Internet using Internet communication protocols.

Tactile effects may thus be combined with animation to provide real-time simulation and stimulation of users working with 3D images generated by the MVD system 10. For example, the viewer 12 may be a surgeon teaching medical students, in which the surgeon views and manipulates the first 3D image 34 in virtual reality, while the students observe the second 3D image 56 correspondingly manipulated and modified due to the real image projector 54 responding to changes in the first 3D image 34. The students then may take turns to individually manipulate the image 34, such as the image of a heart, which may even be a beating heart by imaging animation as the 3D images 34, 54. The teaching surgeon may then observe and grade students in performing image manipulation as if such images were real, such as a simulation of heart surgery.

THE MOE DEVICE

In an illustrated embodiment, the MOE device 32 is composed of a stack of single pixel liquid crystal displays (LCDs), composed of glass, as the optical elements 36–42, which are separated by either glass, plastic, liquid, or air spacers. Alternatively, the optical elements 36–42 may be composed of plastic or other su construction. The glass, plastic, and/or air spacers may be combined with the glass LCDs in an optically continuous configuration to eliminate reflections at internal interfaces. The surfaces of the LCDs and spacers may be optically combined by either optical contact, index matching fluid, or optical cement. Alternatively, the spacers may be replaced by liquid such as water, mineral oil, or index matching fluid, with such liquids able to be circulated through an external chilling device to cool the MOE device 32. Also, such liquid-spaced MOE devices 32 may be transported and installed empty to reduce the overall weight, and the spacing liquid may be added after installation.

In a preferred embodiment, the optical elements 36–42 are planar and rectangular, but alternatively may be curved and/or of any shape, such as cylindrical. For example, cylindrical LCD displays may be fabricated by difference techniques such as extrusion, and may be nested within each other. The spacing distance between the optical elements 36–42 may be constant, or in alternative embodiments may be variable such that the depth of the MOE device 32 may be greatly increased without increasing the number of optical elements 36–42. For example, since the eyes of the viewer 12 lose depth sensitivity with increased viewing distance, the optical elements positioned further from the viewer 12 may be spaced further apart. Logarithmic spacing may be implemented, in which the spacing between the optical elements 36–42 increased linearly with the distance from the viewer 12.

Figure 2:
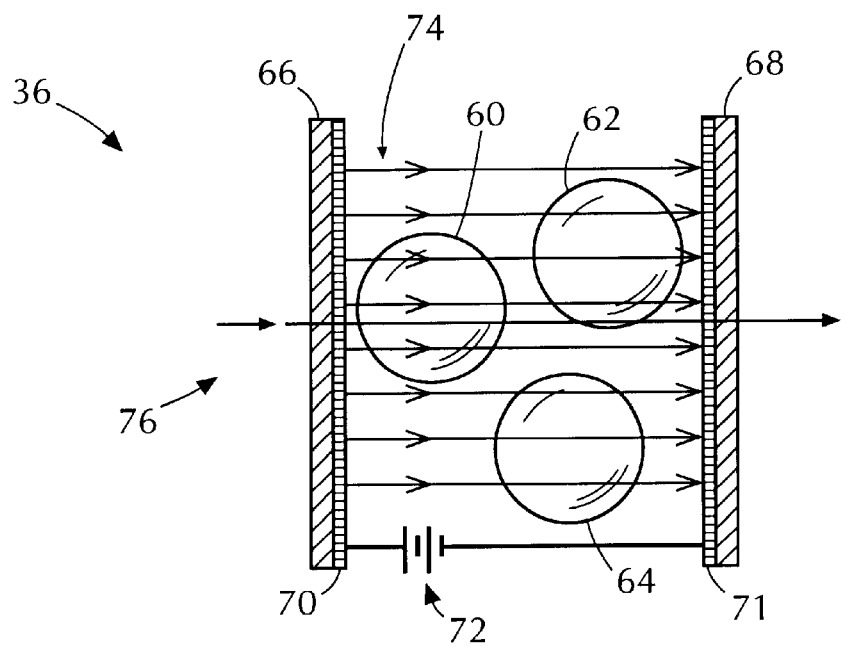
FIG. 2 illustrates a liquid crystal based optical element having a transparent state.
Figure 3:
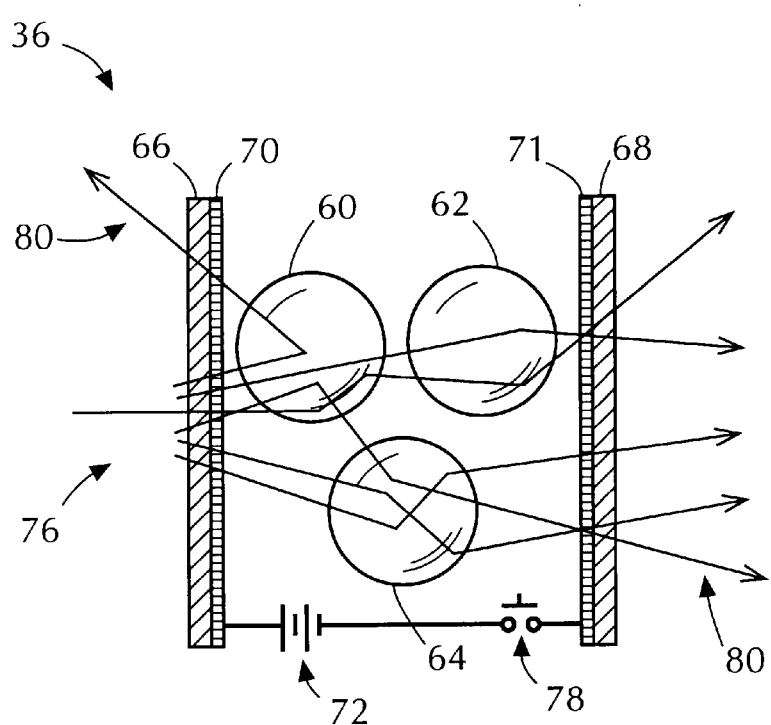
FIG. 3 illustrates the optical element of FIG. 2 in a scattering opaque state.

The optical elements 36–42 are composed of a liquid crystal formulation with the property to be electronically switched rapidly, for example, by an MOE device driver of the MVD controller 18, to be switched between a clear, highly transparent state, as shown in FIG. 2, and a opaque, highly scattering state, as shown in FIG. 3. Referring to FIGS. 2–3 with a cross-section of the optical element 36 being illustrated, liquid crystal molecules 60–64 may be suspended between the substrates 66–68, which may be glass, plastic, or air spacers, and may also have transparent conducting layers 70, 71 applied to the substrates 66–68, respectively.

The conducting layers 70, 71 may be composed of a sputtered or evaporated thin film of indium tin oxide (ITO), which has an excellent transparency and low resistance, but has a relatively high refractive index compared to the refractive indices of the glass or plastic substrates 66–68. The refractive index difference between these materials may produce reflections at the interfaces thereof, so additional coatings or layers of anti-reflection (AR) material may optionally be disposed on the substrates 66–68 between the conducting layers 70, 71 and the substrates 66–68 to reduce the amount of reflected light, such as unwanted reflections. For example, an AR layer having an optical thickness of one quarter of a typical wavelength of light, such as 76 nm., and having a refractive index of about 1.8 reduces the reflection at the substrate-conductive layer interface to very low levels.

By using the AR coatings, the spacing material between optical elements 36–42 may be removed to leave air or vacuum therebetween, thus reducing the overall weight of the MOE device 32. Such AR coatings may be vacuum deposited, or may be evaporated or sputtered dielectrics. Alternatively, the AR coatings may be applied by spin coating, dip coating, or meniscus coating with SOL-GEL.

Referring to FIG. 2, using such conductive layers 70, 71, a source 72 of voltage therebetween, for example, from the MVD controller 18, generates an electric field 74 between the substrates 66–68 of the optical element 36, which causes the liquid crystal molecules 60–64 to align and to transmit light 76 through the optical element 36 with little or no scattering, and so the optical element 36 is substantially transparent.

Referring to FIG. 3, removal of the voltage 72 may occur, for example, by opening the circuit between the conductive layers 70, 71, such as by opening a rapidly switchable switch 78 controlled by the MVD controller 18. Upon such removal of the voltage 72, the liquid crystal molecules 60–64 are oriented randomly, and so the light 76 is randomly scattered to generate scattered light 80. In this configuration, the optical element 36 appears opaque, and so may serve as a projection screen to receive and display the respective image 44 focused thereupon by the image projector 20.

In an alternative embodiment, referring to FIGS. 2–3, the illustrated optical element 36 may be activated to be in the transparent state shown in FIG. 2 by connecting the conductive layer 70 adjacent to a first substrate 66 to ground while connecting the conductive layer 71 adjacent to a second substrate 68 to a supply voltage, such as a voltage in the range of about 50 V to about 250 V. To switch the optical element 36 to be in the scattering, opaque state as in FIG. 3, the application of voltage is reversed, that is, the conductive layer 71 is grounded for a pre-determined delay such as about 1 ms to about 5 ms, and then the conductive layer 70 is connected to the supply voltage. The procedure is again reversed to return the optical element 36 to the transparent state. Accordingly, no average direct current (DC) or voltage is applied to the optical element 36, which can lead to failure by having a constant applied voltage. Also, there is no continuous alternating current (AC) or voltage which generates heating and increases power requirements to the optical elements.

In operation, only a single one of the optical elements 36–42 of the MOE devices 32 is in the scattering opaque state at any given time, thus forming a scattering plane or surface. As the image projector 20 projects the slices 24–30 at a high rate through a projection cycle, with one slice emitted per cycle, the scattering plane is rapidly rastered through the depth of the MOE device 32 to form an effectively variable depth projection screen, while the remaining transparent optical elements permit the viewer 12 to see the displayed image from the received image slices 24–30.

As shown in FIGS. 4–7, as successive frame data is fed from the MVD controller 18 to the image projector 20 to generate images 82–88 therefrom, the MVD controller 18 synchronizes the switching of the optical elements 36–42 such that the optical element 36 is opaque as the image 82 is emitted thereon as in FIG. 4, the optical element 38 is opaque as the image 84 is emitted thereon as in FIG. 5, the optical element 40 is opaque as the image 86 is emitted thereon as in FIG. 6, and the optical element 42 is opaque as the image 88 is emitted thereon as in FIG. 7. The MVD controller 18 may introduce a delay between feeding each set of frame data to the image projector 20 and causing a given optical element to be opaque so that the image projector has enough time during the delay to generate the respective images 82–88 from the sets of frame data 1–4, respectively.

Referring to FIGS. 4–7, while one optical element is opaque and displays the respective image thereon, the remaining optical elements are transparent, and so the image 82 in FIG. 4 on optical element 36 is visible through, for example, at least optical element 38, and similarly image 84 is visible through at least optical element 40 in FIG. 5, and image 86 is visible through at least optical element 42. Since the images 82–88 are displayed at a high rate by the image projector 20 onto the optical elements 36–42 which are switched to opaque and transparent states at a comparably high rate, the images 82–88 form a single volumetric 3D image 34.

To form a continuous volumetric 3D image 34 without perceivable flicker, each optical element 36–42 is to receive a respective image and is to be switched to an opaque state at a frame rate greater than about 35 Hz. Accordingly, to refresh and/or update the entire 3D image, the frame rate of the image projector 20 is to be greater than about N×35 Hz. For a stack of 50 LCD elements forming the MOE device 32 having an individual optical element frame rate of 40 Hz, the overall frame rate of the image projector 20 is to be greater than about 50×40 Hz=2 kHz. High performance and/or high quality volumetric 3D imaging by the MVD system 10 may require greater frame rates of the image projector 20 on the order of 15 kHz.

In one embodiment, the images 82–84 of FIGS. 4–7 are displayed sequentially, with such sequential frame ordering being the updating of the range of depth once per volume period to update the entire volume of optical elements 36–42 in the MOE device 32. Such sequential frame ordering may be sufficient in marginal frame rate conditions, such as frame display rates of about 32 Hz for still images 82–88 and about 45 Hz for images 82–88 displaying motion. In an alternative embodiment, semi-random plane ordering may be performed to lower image jitter and to reduce motion artifacts, in which the range of depth is updated at a higher frequency although each optical element is still only updated once per volume period. Such semi-random plane ordering includes multi-planar interlacing in which even numbered planes are illuminated with images, and then odd numbered planes are illuminated, which increases the perceived volume rate without increasing the frame rate of the image projector 20.

The MOE device 32 maintains the image resolution originally generated in the image projector 20 to provide high fidelity three-dimensional images. The liquid crystal panels 36–42 are highly transparent and haze-free in the clear, transparent state, and are capable of switching rapidly between the clear, transparent state and the opaque, scattering states, in which the light and images from the image projector 20 is efficiently and substantially scattered.

In additional embodiments, the MOE device 32 may be constructed to be lightweight. The liquid crystal panels 36–42 may be composed of a pair of glass substrates coated on their inner surfaces, with the transparent conducting layers 70, 71 being coated with an insulating layer. A polymer alignment layer may optimally be disposed upon the insulating layer. Between the substrates of a given liquid crystal panel, a thin layer of liquid crystal composition is disposed to be about 10–20 microns thick.

The majority of the volume and weight of the panels is associated with the glass substrates, which contributes to a potentially very heavy MOE device 32 as the transverse size and the number of panels are increased. Implementation of the liquid crystal panels 36–42 to be composed of plastic substrates is one solution to the increase in weight. Other implementations include using processing methods to produce the optical elements of the MOE device 32 on a roll-to-roll process on very thin plastic substrates, to allow fabrication to be produced by a continuous and very low cost method.

Using such relatively lightweight components for the MOE device 32, the MOE device 32 may also be collapsible when not in operation, to allow the MVD system 10 to be portable. Also, the optical elements 36–42 may include other inorganic materials in addition to or instead of liquid crystal technology, such as an ITO layer organically applied by spin or dip coating.

THE HIGH FRAME RATE IMAGE PROJECTOR

The maximum resolution and color depth of the three-dimensional images 34, 56 generated by the MVD system 10 is directly determined by the resolution and color depth of the high frame rate image projector 20. The role of the MOE device 32 is primarily to convert the series of two-dimensional images from the image projector 20 into a 3D volume image.

In one embodiment, the image projector 20 includes an arc lamp light source with a short arc. The light from the lamp is separated into red, green and blue components by color separation optics, and is used to illuminate three separate spatial light modulators (SLMs). After modulation by the SLMs, the three color channels are recombined into a single beam and projected from the optics 22, such as a focusing lens, into the MOE device 32, such that each respective two-dimensional image from the slices 24–30 is displayed on a respective one of the optical elements 36–42.

In another embodiment, the image projector 20 includes high power solid state lasers instead of an arc lamp and color separation optics. Laser light sources have a number of advantages, including, increased efficiency, a highly directional beam, and single wavelength operation. Additionally, laser light sources produce highly saturated, bright colors.

In a further embodiment, different technologies may be used to implement the SLM, provided that high speed operation is attained. For example, high speed liquid crystal devices, modulators based on micro-electromechanical (MEMs) devices, or other light modulating methods may be used to provide such high frame rate imaging. For example, the Digital Light Processing (DLP) technology of TEXAS INSTRUMENTS, located in Dallas, Tex.; the Grating Light Valve (GLV) technology of SILICON LIGHT MACHINES, located in Sunnyvale, California; and the Analog Ferroelectric LCD devices of BOULDER NONLINEAR SYSTEMS, located in Boulder, Co., may be used to modulate the images for output by the image projector 20. Also, the SLM may be a ferroelectric liquid crystal (FLC) device, and polarization biasing of the FLC SLM may be implemented.

Figure 8:
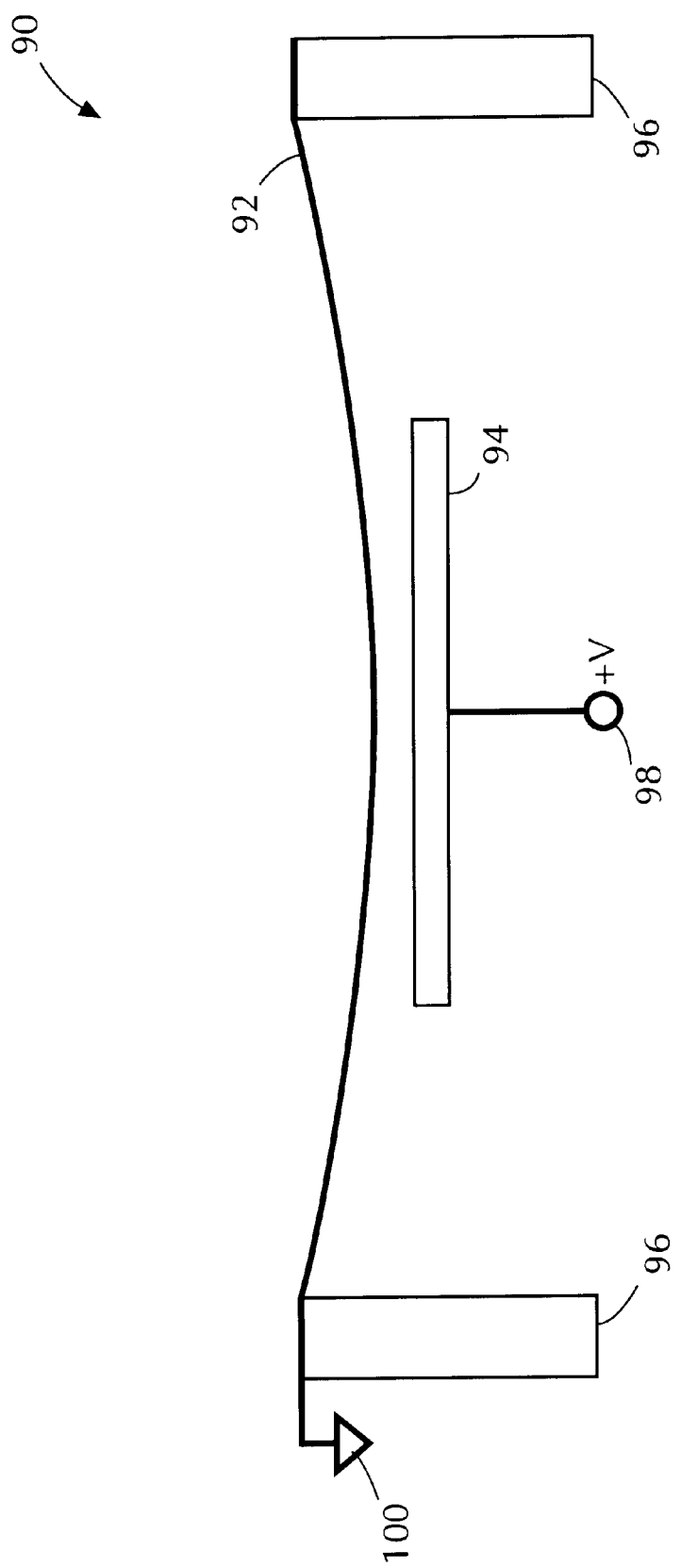
FIG. 8 illustrates a membrane light modulator.

To obtain very high resolution images in the MVD system 10, the images 44–50 must be appropriately and rapidly re-focused onto each corresponding optical element of the MOE device 32, in order to display each corresponding image on the optical element at the appropriate depth. To meet such re-focusing requirements, adaptive optics systems are used, which may be devices known in the art, such as the fast focusing apparatus described in G. Vdovin, "Fast focusing of imaging optics using micromachined adaptive mirrors", available on the Internet at http://guernsey.et.tudelft.nl/focus/index.html. As shown in FIG. 8, a membrane light modulator (MLM) 90 has as a thin flexible membrane 92 which acts as a mirror with controllable reflective and focusing characteristics. The membrane 92 may be composed of a plastic, nitrocellulose, "MYLAR", or then metal films under tension and coated with a conductive reflecting layer of metal coating which is reflective, such as aluminum. An electrode and/or a piezoelectric actuator 94 is positioned to be substantially adjacent to the membrane 92. The electrode 94 may be flat or substantially planar to extend in two dimensions relative to the surface of the membrane 92. The membrane 92 is mounted substantially adjacent to the electrode 94 by a mounting structure 96, such as an elliptical mounting ring, such as a circular ring.

The electrode 94 is capable of being placed at a high voltage, such as about 1,000 volts, from a voltage source 98. The voltage may be varied within a desired range to attract and/or repel the membrane 92. The membrane 92, which may be at ground potential by connection to ground 100, is thus caused by electrostatic attraction to deflect and deform into a curved shape, such as a parabolic shape. When so deformed, the membrane 92 acts as a focusing optic with a focal length and thus a projection distance which can be rapidly varied by varying the electrode voltage. For example, the curved surface of the membrane 92 may have a focal length equal to half of the radius of curvature of the curved membrane 92, with the radius of curvature being determined by the tension on the membrane 92, the mechanical properties of the material of the membrane 92, the separation of the membrane 92 and the electrode 94, and the voltage applied to the electrode 94.

In one embodiment, the deflection of the membrane 94 is always toward the electrode 94. Alternatively, by placing a window with a transparent conducting layer on the opposite side of the membrane 92 from the electrode 94, and then applying a fixed voltage to the window, the membrane 92 may be caused to deflect in both directions; that is, either away from or toward the electrode 94, thus permitting a greater range of focusing images. Such controlled variation of such a membrane 92 in multiple directions is described, for example, in a paper by Martin Yellin in the SPIE CONFERENCE PROCEEDINGS, VOL. 75, pp. 97–102 (1976).

The optical effects of the deflections of the MLM 90 may be magnified by the projection optics 22, and cause the projected image from an object plane to be focused at varying distances from the image projector 20 at high re-focusing rates. Additionally, the MLM 90 can maintain a nearly constant image magnification over its full focusing range.

Figure 9:
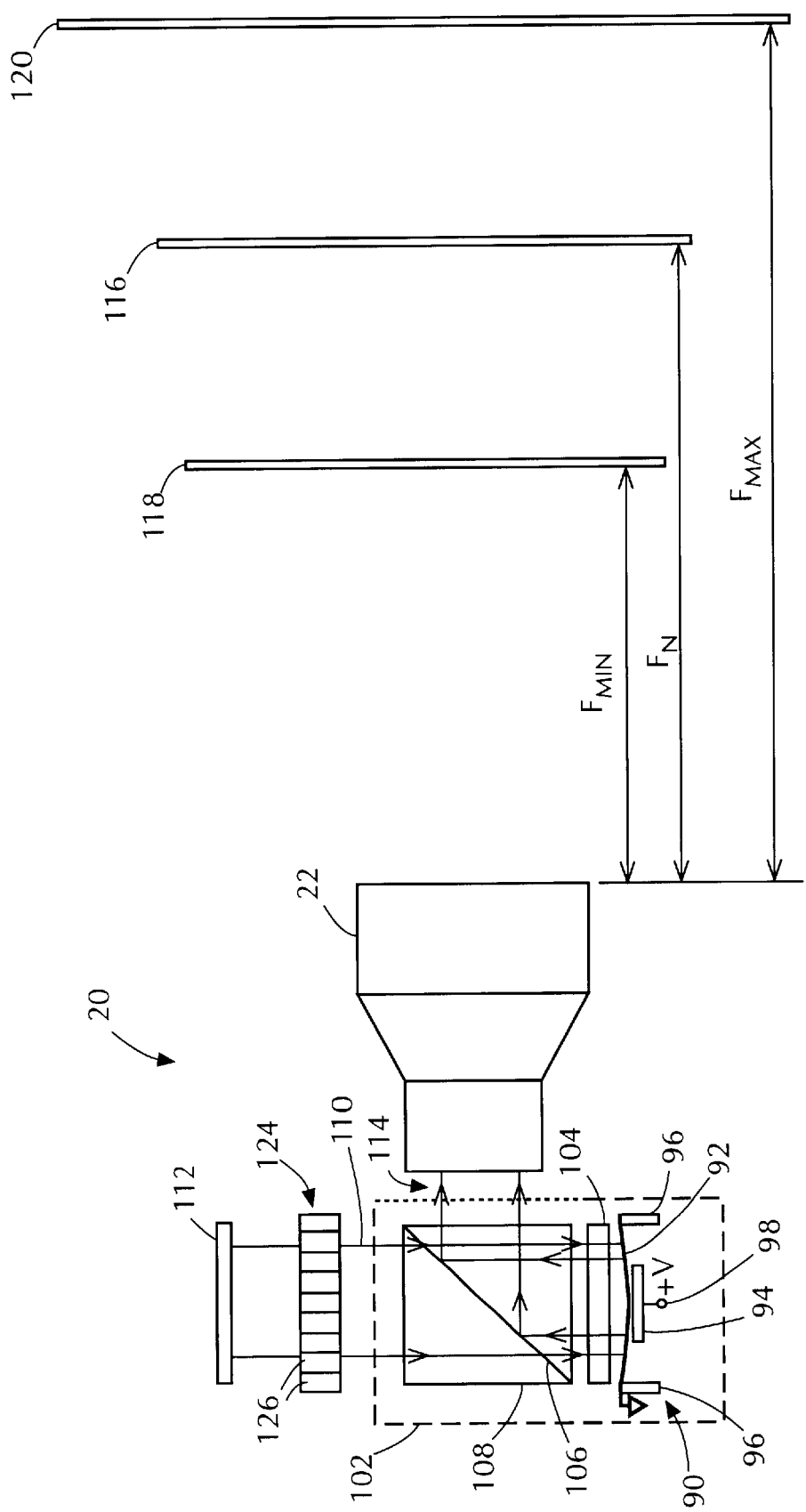
FIG. 9 illustrates an adaptive optics system used in an image projector.

Referring to FIG. 9, the MLM 90 may be incorporated into an adaptive optics system 102, for example, to be adjacent to a quarter waveplate 104 and a beamsplitter 106 for focusing images to the projection optics 22. Images 110 from an object or object plane 112 pass through the polarizer 108 to be horizontally polarized by the beamsplitter 106, and thence to pass through the quarter waveplate 104 to result in circularly polarized light incident on the membrane 92 for reflection and focusing. After reflection, such focused images 114 are passed back through the quarter waveplate 104 resulting in light 114 polarized at 90° to the direction of the incident light 110. The beamsplitter 106 then reflects the light 114 toward the projection optics 22 to form an image of the object. By using the quarter waveplate 104 and polarizer 108 with the MLM 90, the adaptive optic system may be folded into a relatively compact configuration, which avoids mounting the MLM 90 off-axis and/or at a distance from the projection lens 22.

The images may be focused at a normal distance $F_N$ to a normal projection plane 116 from the projection optics 22, and the images may be refocused at a high rate between a minimum distance $F_{MIN}$ from a minimum projection plane 118 to a maximum distance $F_{MAX}$ to a maximum projection plane 120 from the projection optics 22 with high resolution of the image being maintained.

Figure 10:
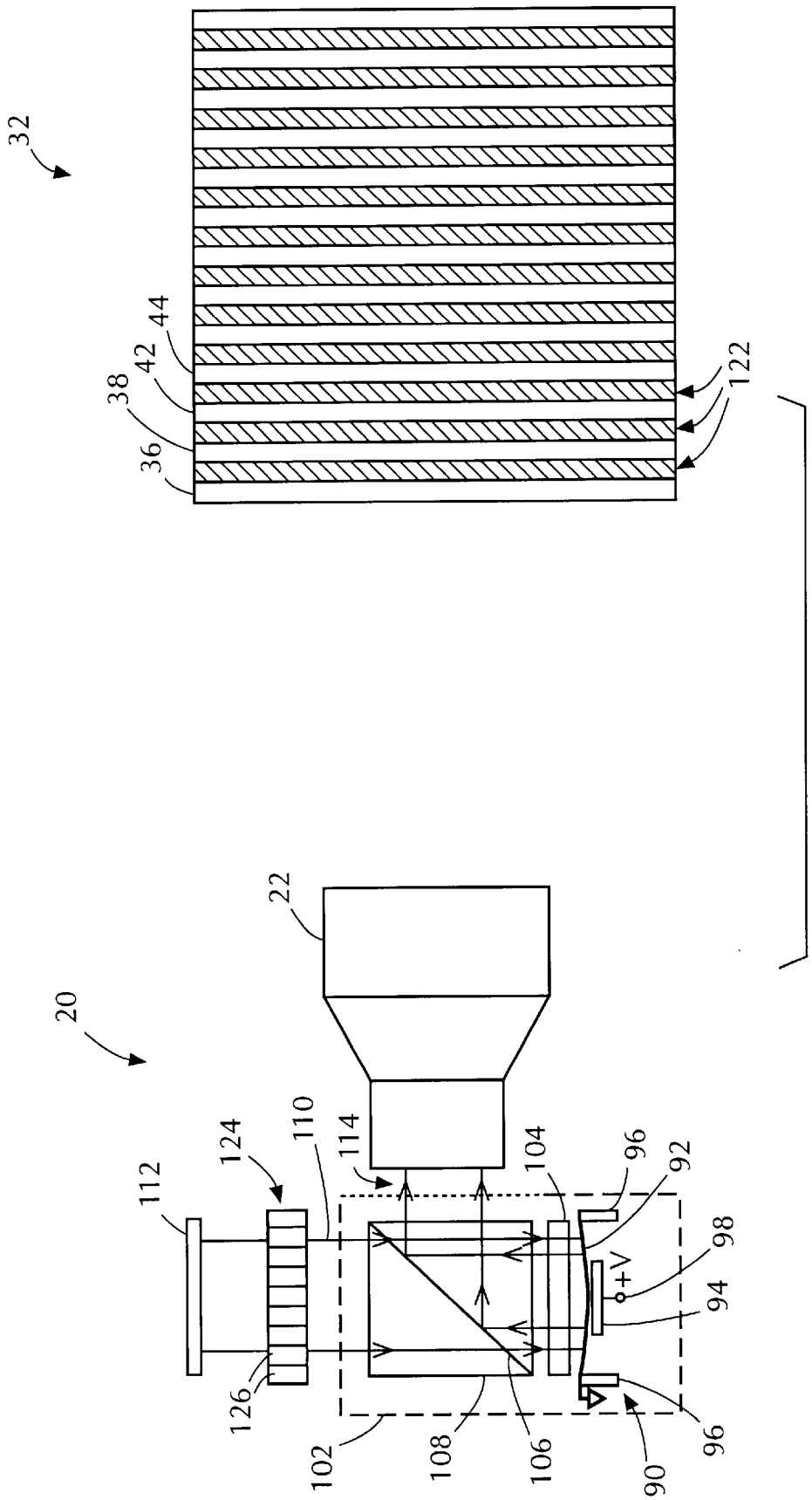
FIG. 10 illustrates the adaptive optics system of FIG. 9 in conjunction with a multiple optical element system.

As shown in FIG. 10, the image projector 20 including the adaptive optics system with the MLM 90, quarter waveplate 104, and polarizer 108 may thus selectively and rapidly project individual 2D slices of the 3D image onto individual optical elements 36–42, such that the 2D slices are focused on at least one optical element, with a high focusing accuracy such that the 2D slices are not incident on the spacers 122 between the optical elements 36–44 of the MOE device 32.

Referring to FIGS. 9–10, in another alternative embodiment, the image projector 20 may include an SLM 124 having a plurality of pixels 126 for modulating the light 110 from the object plane 112. Twisted nematic (TN) SLMs may be used, in which a switchable half waveplate is formed by producing alignment layers on the front and rear substrates of the SLM 124 which differ in orientation by 90°. The liquid crystal of the TN SLM aligns to the alignment layer on each surface, and then joins smoothly between the two substrates to form a one-half period of a helix. If the pitch of the helix is chosen to be near the wavelength of light, the helix acts as a half-waveplate and rotates the incident light polarization by 90°. The application of an electric field of sufficient strength to the TN SLM causes the bulk of the liquid crystal material between the two substrates to reorient to point perpendicular to the substrates, which unwinds the helix and destroys the half waveplate, thus eliminating the rotation of the polarization of the incident light. The lack of an inherent polarization in the TN liquid crystal material causes TN SLMs to be insensitive to the sign of the applied voltage, and either sign of voltage results in the same reduction in waveplate action, so the TN SLM acts as a waveplate with a retardation being a function of the magnitude of the applied voltage.

Figure 11:
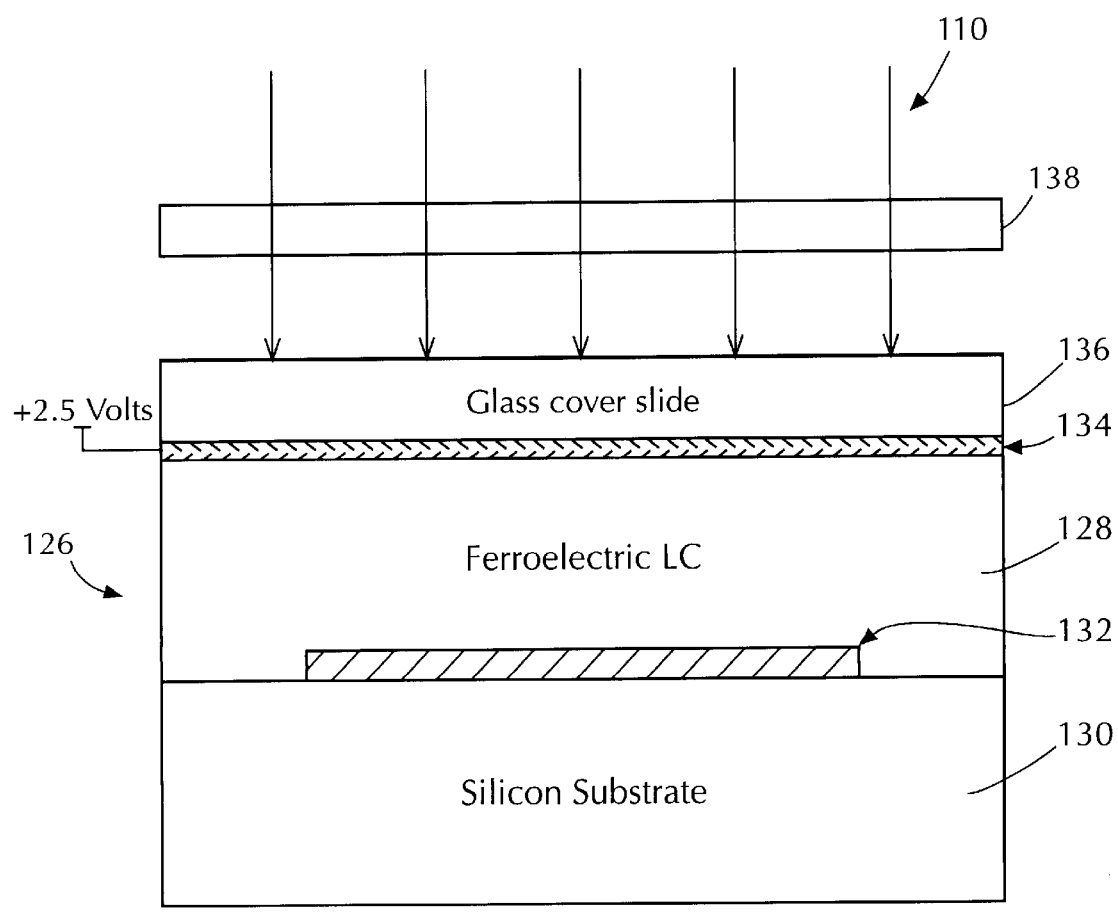
FIG. 11 illustrates a side cross-sectional view of a pixel of a ferroelectric liquid crystal (FLC) spatial light modulator (SLM)

Alternatively, as shown in FIG. 11, the SLM 124 may be a ferroelectric liquid crystal (FLC) based device composed of a plurality of pixels 126, with each pixel 126 having the FLC material 128 positioned over a semiconductor substrate such as a silicon substrate 130, with an electrode 132 disposed therebetween. The electrode 132 may be composed of aluminum. A transparent conductor 134 is disposed above the FLC material 128 and is connected to a voltage source, such as a 2.5 V operating voltage. A cover slide 136 composed, for example, of glass is positioned over the transparent conductor 134.

FLC SLMs composed of such pixels 126 operate in a manner similar to twisted nematic (TN) SLMs, in which the application of an electric field, for example, between the electrode 128 and the conductor 134, results in the rotation of polarization of incident light. The degree of rotation is proportional to the applied voltage, and varies from 0° to 90°. In combination with an external polarizer, such as the polarizer 108, the polarization rotation of the SLM 124 results in intensity modulation of the incident light.

Unlike a TN SLM, an FLC SLM possesses an inherent polarization, which results in an FLC SLM having a desired thickness forms a waveplate with a retardation independent of the applied voltage. The FLC SLM acts as a waveplate with an orientation being a function of both the magnitude and the sign of the applied voltage.

For the pixel 126 of the FLC SLM 124 of FIG. 11, a half waveplate of the FLC SLM 124 is typically implemented to have an unpowered orientation that is about 22.5° to a horizontal reference axis, resulting in a 45° rotation of the incident light polarization. When powered, the transparent conductor 134 is biased to 2.5 V, which may be half the voltage range of the electrode 132 of the pixel 126.

Figure 12:
FIGS. 12–14 illustrate angular orientations of the axes of the FLC SLM of FIG. 11.
Figure 13:
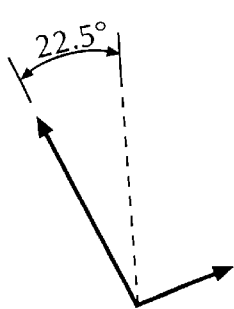
Figure 14:
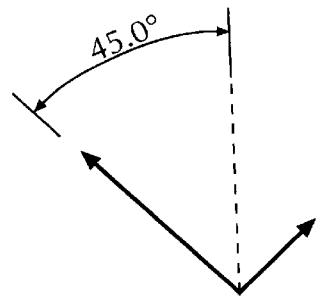

Referring to FIGS. 12–14, the orientations of the principle axes of the half waveplate formed by the pixels 126 of the FLC SLM 124 are shown at 0 V, 2.5 V, and 5 V, respectively, to have a 0°, a 45°, and a 90° polarization, respectively.

Both TN SLMs and FLC SLMs are to be direct current (DC) balanced to maintain correct operation. The application of a continuous DC electric field to the pixels 126 results in the destruction of the alignment layers on the substrates by impurity ion bombardment, which ruins the pixel 126. To prevent such damage, the electric field is periodically and/or irregularly reversed in sign with a frequency on the order of about 100 Hz for TN SLMs, and about 1 Hz for FLC SLMs. The lack of sensitivity of the TN SLM to the sign of the electric field results in the image passing therethrough having a constant appearance as the electric field is reversed. However, an FLC SLM is typically sensitive to the sign of the field, which results in grayscale inversion by which black areas of the image changing to white and white areas changing to black as the SLM is DC balanced.

To prevent grayscale inversion during DC balancing of the SLM 124, the polarization of the incident light is biased so that the positive and negative images caused by the application of the electric field to the pixels 126 have the same appearance. The SLM 124 and/or the individual pixels 126 have a static half waveplate 138 positioned to receive the incident light 110 before the SLM 124. The waveplate 138 is oriented to provide a 22.5° rotation of the polarization of the incident light, with the resulting grayscale having a maximum brightness with either 0 V or 5 V are applied to the electrode 132, and has a minimum brightness when 2.5 V is applied to the electrode 132. In alternative embodiments, to prevent reduction of the maximum brightness by inclusion of the waveplate 138, FLC material 128 having a static orientation of 45° may be used, which allows the maximum brightness of a polarization biased FLC SLM 124 to match the maximum brightness of the unbiased SLM 124 without the waveplate 138.

As described above, in alternative embodiments of the image projector 20, lasers may be used such as colored and/or solid state color-producing lasers at the object plane 112. Such lasers may, for example, incorporate blue and green solid state lasers currently available in other information storage and retrieval technologies, such as CDROMs as well as laser video systems.

In one alternative embodiment of the image projector 20, the adaptive optics may be used in a heads-up display to product the 3D image that is not fixed in depth but instead may be moved toward or away form the viewer 12. Without using the MOE device 32, the 2D image slices 24-30 may be projected directly into the eye of the viewer 12 to appear at the correct depth. By rapidly displaying such slices 24-30 to the viewer 12, a 3D image is perceived by the viewer 12. In this embodiment of the MVD system 10, the adaptive optics of the image projector 20 and other components may be very compact to be incorporated into existing heads-up displays for helmet-mounted displays or in cockpit or dashboard mounted systems in vehicles.

In another embodiment, the slices 24-30 may be generated and projected such that some of the images 44-50 are respectively displayed on more than one of optical elements 36-42, in order to oversample the depth by displaying the images over a range of depths in the MOE device 32 instead of at a single depth corresponding to a single optical element. For example, oversampling may be advantageous if the MOE device 32 has more planes of optical elements 36-42 than the number of image slices 24-30, and so the number of images 44-50 is greater than the number of image slices 24-30. For example, a slice 24 displayed on both of optical elements 36-38 as images 44-46, respectively. Such oversampling generates the 3D image 34 with a more continuous appearance without increasing the number of optical elements 36-42 or the frame rate of the image projector 20. Such oversampling may be performed, for example, by switching multiple optical elements to be in an opaque state to receive a single projected slice during a respective multiple projection cycles onto the respectively opaque multiple optical elements.

GENERATION OF THE 3D IMAGE FROM A MULTI-PLANAR DATASET

To generate the set of 2D image slices 24-30 to be displayed as a set of 2D images 44-50 to form the 3D image 34, a multi-planar dataset is generated from the 3D image data received by the MVD controller 18 from the graphics data source 16. Each of the slices 24-30 is displayed at an appropriate depth within the MOE device 32; that is, the slices 24-30 are selectively projected onto a specific one of the optical elements 36-42. If the slices 24-30 of the 3D image 34 are made close enough, the image 34 appears to be a continuous 3D image. Optional multi-planar anti-aliasing described herein may also be employed to enhance the continuous appearance of the 3D image 34.

A method of computing a multi-planar dataset (MPD) is performed by the MVD system 10. In particular, the MVD controller 18 performs such a method to combine the information from a color buffer and a depth (or z) buffer of the frame buffer of the graphics data source 16, which may be a graphics computer. The method also includes fixed depth operation and anti aliasing.

Figure 15:
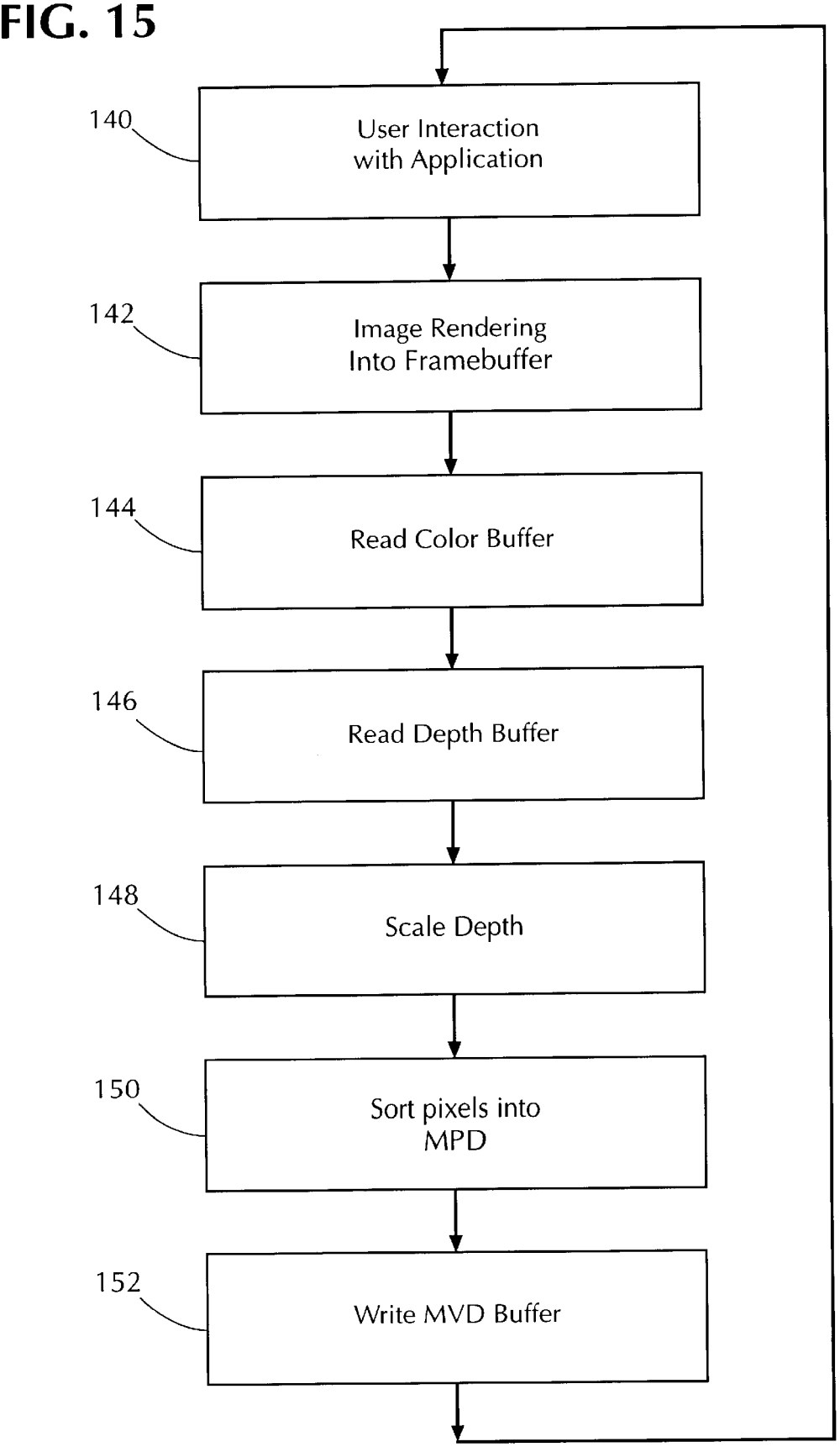
FIG. 15 illustrates a flow chart of a method for generating a multi-planar dataset.

Referring to FIG. 15, the method responds in step 140 to interaction with the user 12 operating the MVD system 10, such as through a GUI or the optional user feedback device 58 to select and/or manipulate the images to be displayed. From such operation and/or interaction, the MVD system 10 performs image rendering in step 142 from image data stored in a frame buffer, which may be, for example, a memory of the MVD controller 18. The frame buffer may include sub-buffers, such as the color buffer and the depth buffer. During a typical rendering process, a graphics computer computes the color and depth of each pixel in the same (x, y) position in the depth buffer. If the depth of a new pixel is less than the depth of the previously computed pixel, then the new pixel is closer to the viewer, so the color and depth of the new pixel are substituted for the color and depth of the old pixel in both of the color and depth buffers, respectively. Once all objects in a scene are rendered as a dataset for imaging, the method continues in steps 144-152. Alternatively or in addition, the rendered images in the frame buffer may be displayed to the viewer 12 as a 3D image on a 2D computer screen as a prelude to generation of the 3D image as a volumetric 3D image 34, thus allowing the viewer 12 to select which images to generate as the 3D image 34.

In performing the method for MPD computation, the data from the color buffer is read in step 144, and the data from the depth buffer is read in step 146. The frame buffer may have, for example, the same number of pixels in the x-dimension and the y-dimension as the desired size of the image slices 24-30, which may be determined by the pixel dimensions of the optical elements 36-42. If the number of pixels per dimension is not identical between the frame buffer and the image slices 24-30, the data in the color and depth buffers are scaled in step 148 to have the same resolution as the MVD system 10 with the desired pixel dimensions of the image slices 24-30. The MVD controller 18 includes an output buffer in the memory for storing a final MPD generated from the data of the color and depth buffers, which may be scaled data as indicated above.

The output buffer stores a set of data corresponding to the 2D images, with such 2D images having the same resolution and color depth as the images 44-50 to be projected by the slices 24-30. In a preferred embodiment, the number of images 44-50 equals the number of planes formed by the optical elements 36-42 of the MOE device 32. After the MPD calculations are completed and the pixels of the 2D images are sorted in the output buffer in step 150, the output buffer is transferred to an MVD image buffer, which may be maintained in a memory in the image projector 20, from which the 2D images are converted to image slices 24-30 to form the 3D image 34 to be viewed by the viewer 12, as described above. The method then loops back to step 140, for example, concurrently with generation of the 3D image 34, to process new inputs and thence to update or change the 3D image 34 to generate, for example, animated 3D images.

The MVD system 10 may operate in two modes: variable depth mode and fixed depth mode. In variable depth mode, the depth buffer is tested prior to the MPD computations including step 146, in order to determine a maximum depth value $Z_{MAX}$ and the minimum depth value $Z_{MIN}$, which may correspond to the extreme depth values of the 3D image on a separate 2D screen prior to 3D volumetric imaging by the MVD system 10. In the fixed depth mode, the $Z_{MAX}$ and $Z_{MIN}$ are assigned values by the viewer 12, either interactively or during application startup to indicate the rear and front bounds, respectively, of the 3D image 34 generated by the MVD system 10. Variable depth mode allows all of the objects visible on the 2D screen to be displayed in the MOE device 32 regardless of the range of depths or of changes in image depth due to interactive manipulations of a scene having such objects.

In the fixed depth mode, objects which may be visible on the 2D screen may not be visible in the MOE device 32 since such objects may be outside of a virtual depth range of the MOE device 32. In an alternative embodiment of the fixed depth mode, image pixels which may be determined to lie beyond the "back" or rearmost optical element of the MOE device 32, relative to the viewer 12, may instead be displayed on the rearmost optical element. For example, from the perspective of the viewer 12 in FIG. 1, the optical element 36 is the rearmost optical element upon which distant images may be projected. In this manner, the entire scene of objects remains visible, but only objects with depths between $Z_{MAX}$ and $Z_{MIN}$ are visible in the volumetric 3D image generated by the MOE device 32.

In the MPD method described herein, using the values of $Z_{MAX}$ and $Z_{MIN}$, the depth values within the depth buffer may be offset and scaled in step 148 so that a pixel with a depth of $Z_{MIN}$ has a scaled depth of 0, and a pixel with a depth of $Z_{MAX}$ has a scaled depth equal to the number of planes of optical elements 36–42 of the MOE device 32. In step 150, such pixels with scaled depths are then sorted and stored in the output buffer by testing the integer portion $\lfloor d_i \rfloor$ of the scaled depth values $d_i$, and by assigning a color value from the color buffer to the appropriate MPD slices 24–30 at the same (x,y) coordinates. The color value may indicate the brightness of the associated pixel or voxel.

Using the disclosed MPD method, the volumetric 3D images 34 generated by the MVD system 10 may be incomplete; that is, objects or portions thereof are completely eliminated if such objects or portions are not visible from the point of view of a viewer viewing the corresponding 3D image on a 2D computer screen. In a volumetric display generated by the MVD system 10, image look-around is provided allowing a viewer 12 in FIG. 1 to move to an angle of view such that previously hidden objects become visible, and so such MVD systems 10 are advantageous over existing 2D displays of 3D images.

In alternative embodiments, the MPD method may implement anti-aliasing, as described herein, by using the fractional portion of the scaled depth value; that is, $d_i - \lfloor d_i \rfloor$, to assign such a fraction of the color value of the pixels to two adjacent MVD image slices in the set of slices 24–30. For example, if a scaled depth value is 5.5 and each slice corresponds to a discrete depth value, half of the brightness of the pixel is assigned to each of slice 5 and slice 6. Alternatively, if the scaled depth is 5.25, 75% of the color value is assigned to slice 5 because slice 5 is "closer" the scaled depth, and 25% of the color value is assigned to slice 6.

Different degrees of anti-aliasing may be appropriate to different visualization tasks. The degree of anti-aliasing can be varied from one extreme; that is, ignoring the fractional depth value to assign the color value, to another extreme of using all of the fractional depth value, or the degree of anti-aliasing can be varied to any value between such extremes. Such variable anti-aliasing may be performed by multiplying the fractional portion of the scaled depth by an anti-aliasing parameter, and then negatively offsetting the resulting value by half of the anti-aliasing parameter. The final color value may be determined by fixing or clamping the negatively offset value to be within a predetermined range, such as between 0 and 1. An anti-aliasing parameter of 1 corresponds to full anti-aliasing, and an anti-aliasing parameter of infinity, $\infty$, corresponds to no anti-aliasing. Anti-aliasing parameters less than 1 may also be implemented.

In scaling the depth buffer values, a perspective projection may be used, as specified in the Open Graphics Library (OpenGL) multi-platform software interface to graphics hardware supporting rendering and imaging operations. Such a perspective projection may result in a non-linearity of values in the depth buffer. For an accurate relationship between the virtual depth and the visual depth of the 3D image 34, the MVD controller 18 takes such non-linearity into account in producing the scaled depth in step 148. Alternatively, an orthographic projection may be used to scale the depth buffer values in step 148.

In existing 2D monitors, perspective is generated computationally in the visualization of 3D data to create a sense of depth such that objects further from the viewer appear smaller, and parallel lines appear to converge. In the disclosed MVD system 10, the 3D image 34 is generated with a computational perspective to create the aforesaid sense of depth, and so the depth of the 3D image 34 is enhanced.

In another embodiment, the slices 24–30 may be generated and projected such that some of the images 44–50 are respectively displayed on more than one of optical elements 36–42, in order to oversample the depth by displaying the images over a range of depths in the MOE device 32 instead of at a single depth corresponding to a single optical element. For example, oversampling may be advantageous if the MOE device 32 has more planes of optical elements 36–42 than the number of image slices 24–30, and so the number of images 44–50 is greater than the number of image slices 24–30. For example, a slice 24 displayed on both of optical elements 36–38 as images 44–46, respectively. Such oversampling generates the 3D image 34 with a more continuous appearance without increasing the number of optical elements 36–42 or the frame rate of the image projector 20. Such oversampling may be performed, for example, by switching multiple optical elements to be in an opaque state to receive a single projected slice during a respective multiple projection cycles onto the respectively opaque multiple optical elements.

ALTERNATIVE EMBODIMENTS OF THE MVD SYSTEM

In one alternative embodiment, the MOE device 32 includes 10 liquid crystal panels 36–42 and is dimensioned to be 5.5 inches (14 cm.) long by 5.25 inches (13.3 cm.) wide by 2 inches (4.8 cm.) in depth. The image projector 20 includes an acousto-optical laser beam scanner using a pair of ion lasers to produce red, green and blue light, which was modulated and then scanned by high frequency sound waves. The laser scanner is capable of vector scanning 166,000 points per second at a resolution of 200×200 points. When combined with the 10 plane MOE device 32 operating at 40 Hz, the MVD system 10 produces 3D images with a total of 400,000 voxels, that is, 3D picture elements. A color depth of 24-bit RGB resolution is obtained, with an image update rate of 1 Hz. Using a real image projector 54, a field of view of 100°×45° can be attained.

In another alternative embodiment, the MOE device 32 includes 12 liquid crystal panels 36–42 and is dimensioned to be 6 inches (15.2 cm.) long by 6 inches (15.2 cm.) wide by 3 inches (7.7 cm.) in depth. The image projector 20 includes a pair of TEXAS INSTRUMENTS DLP video projectors, designed to operate in field-sequential color mode to produce grayscale images at a frame rate of 180 Hz. By interlacing the two projectors, an effectively single projector is formed with a frame rate of 360 Hz, to produce 12 plane volumetric images at a rate of 30 Hz. The transverse resolution attainable is 640×480 points. When combined with the 12 plane MOE device 32 operating at 30 Hz, the MVD system 10 produces gray 3D images with a total of 3,686,400 voxels. A color depth of 8-bit grayscale resolution is obtained, with an image update rate of 10 Hz. Using a real image projector 54, a field of view of 100°×45° can be attained.

In a further alternative embodiment, the MOE device 32 includes 50 liquid crystal panels 36–42 and is dimensioned to be 15 inches (38.1 cm.) long by 13 inches (33.0 cm.) wide by 10inches (25.4 cm.) in depth. The image projector 20 includes a high speed analog ferroelectric LCD available from BOULDER NONLINEAR SYSTEMS, which is extremely fast with a frame rate of about 10 kHz. The transverse resolution attainable is 512×512 points. When combined with the 50 plane MOE device 32 operating at 40 Hz, the MVD system 10 produces 3D images with a total of 13,107,200 voxels. A color depth of 24-bit RGB resolution is obtained, with an image update rate of 10 Hz. Using a real image projector 54, an field of view of 100°×45° can be attained. With such resolutions and a volume rate of 40 Hz non-interfaced, the MVD system 10 has a display capability equivalent to a conventional monitor with a 20 inch (50.8 cm.) diagonal.

In another embodiment, the optical elements 36–42 may have a transverse resolution of 1280×1024 and a depth resolution of 256 planes. The system will potentially operate in a depth interlaced mode in which alternate planes are written at a total rate of 75 Hz, with the complete volume updated at a rate of 37.5 Hz. Such interlacing provides a higher perceived volume rate without having to increase the frame rate of the image projector 20.

In a further embodiment, the MOE device 32 includes 500 planes for a significantly large depth resolution, and a transverse resolution of 2048×2048 pixels, which results in a voxel count greater than 2 billion voxels. The size of the MOE device 32 in this configuration is 33 inches (84 cm.) long by 25 inches (64 cm.) wide by 25 inches (64 cm.) in depth, which is equivalent to a conventional display with a 41 inch (104 cm.) diagonal. The image projector 20 in this embodiment includes the Grating Light Valve technology of SILICON LIGHT MACHINES, to provide a frame rate of 20 kHz.

VIRTUAL INTERACTION APPLICATIONS

Alternative embodiments of the MVD system 10 incorporating the user feedback device 58 as a force feedback interface allow the viewer 12 to perceive and experience touching and feeling the 3D images 34, 56 at the same location where the 3D images 34, 56 appear. The MVD system 10 can generate high resolution 3D images 34, 56, and so virtual interaction is implemented in the MVD system 10 using appropriate force feedback apparatus to generate high resolution surface textures and very hard surfaces, that is, surfaces which appear to resist and/or to have low compliance in view of the virtual reality movements of portions of the surfaces by the viewer 12.

Accordingly, the user feedback device 58 includes high resolution position encoders and a high frequency feedback loop to match the movements of the hands of the viewer 12 with modifications to the 3D images 34, 56 as well as force feedback sensations on the viewer 12. Preferably, the user feedback device 58 includes lightweight and compact virtual reality components, such as force-feedback-inducing gloves, in order that the reduced mass and bulk and the associated weight and inertia of the components impede the motions of the viewer 12 at a minimum.

Such user feedback devices may include lightweight carbon composites to dramatically reduce the weight of any wearable components worn by the viewer 12. Furthermore, very compact and much higher resolution fiber-optic or capacitive-position encoders may be used instead of bulky optical position encoders know in the art to determine the position of portions of the viewer 12 such as hands and head orientations.

The wearable component on the viewer 12 include embedded processor systems to control the user feedback device 58, thus relieving the processing overhead of the MVD controller 18 and/or the interface 14. By using an embedded processor whose only task is to run the interface, the feedback rate for the overall MVD system 10 may be greater than 100 kHz. When combined with very high resolution encoders, the MVD system has a dramatically high fidelity force feedback interface.

Using such virtual interaction technologies with the MVD system 10 which is capable of displaying such volumetric 3D images 34, 56, a 3D GUI is implemented to allow a viewer 12 to access and directly manipulate 3D data. Known interface devices such as the data glove, video gesture recognition devices, and a FISH SENSOR system available from the MIT MEDIA LAB of Cambridge, Mass., can be used to allow a user to directly manipulate 3D data, for example, in 3D graphics and computer aided design (CAD) systems.

For such 3D image and data manipulation, the MVD system 10 may also incorporate a 3D mouse device, such as the SPACE BALL available from Spacetec Imc of Lowell, Mass., as well as a 3D pointing device which moves a 3D cursor anywhere in the display volume around the image 34 in the same manner as a viewer 12 moves one's hand in true space. Alternatively, the MVD system 10, through the user feedback device 58, may interpret movement of the hand of the viewer 12 as the 3D cursor.

In one embodiment, the user feedback device 58 may include components for sensing the position and orientation of the hand of the viewer 12. For example, the viewer 12 may hold or wear a position sensor such as a magnetic sensor available from POLYHEMUS, INC., and/or other types of sensors such as positional sensors incorporated in virtual reality data gloves. Alternatively, the position of the hand is sensed within the volume of the display of the 3D image 34 through the use of computer image processing, or a radiofrequency sensor such as sensors developed at the MIT MEDIA LAB. To avoid muscle fatigue, the user feedback device 58 may sense the movement of a hand or finger of the viewer 12 in a much smaller sensing space that is physically separate from the displayed 3D image 34, in a manner similar to 2D movement of a conventional 2D mouse on the flat surface of a desktop to control the position of a 2D cursor on a 2D screen of a personal computer.

ADVANTAGES OF THE MVD SYSTEM

Using the MVD system 10, the 3D images 34, 56 are generated to provide for natural viewing by the viewer 12, that is, the 3D images 34, 56 have substantially all of the depth cues associated with viewing a real object, which minimizes eye strain and allows viewing for extended time periods without fatigue.

The MVD system 10 provides a high resolution/voxel count, with the MOE device 32 providing voxel counts greater than, for example, 3,000,000, which is at least one order of magnitude over many volumetric displays known in the art. In addition, by preferably using a rectilinear geometry for displaying the 3D image 34, such as an MOE device 32 having a rectangular cross-section adapted to displaying image slices 24–30 as 2D images 44–50, the MVD system 10 uses a coordinate system which matches internal coordinate systems of many known graphics computers and graphical applications program, which facilitates and maximizes computer performance and display update rate without requiring additional conversion software. Additionally, in a preferred embodiment, the image voxels of the MOE 32 have identical and constant shapes, sizes, and orientations, which thus eliminates image distortion in the 3D image 34.

Unlike multiview autostereoscopic displays known in the art, the MVD system 10 provides a wide field of view with both horizontal and vertical parallax, which allows the 3D image to be "looked around" by the view in multiple dimensions instead of only one. In addition, unlike multiview autostereoscopic displays, the field of view of the MVD system 10 is continuous in all directions, that is, there are no disconcerting jumps in the 3D image 34 as the viewer 12 moves with respect to the MOE device 32.

Further, due to the static construction of the optical elements 36–42 in the MOE device 32, there are no moving parts which, upon a loss of balance of the entire MOE device 32, results in image distortions, display vibrations, and even catastrophic mechanical failure of the MOE device 32

The MVD system 10 may also avoid occlusion, that is, the obstruction by foreground objects of light emitted by background objects. A limited form of occlusion, called computational occlusion, can be produced by picking a particular point of view, and then simply not drawing surfaces that cannot be seen from that point of view, in order to improve the rate of image construction and display. However, when the viewer 12 attempts to look around foreground objects, the parts of background objects that were not drawn are not visible. In one embodiment, the MVD system 10 compensates for the lack of occlusion by interspersing scattering optical element displaying an image with other optical elements in a scattering state to create occlusion by absorbing background light. Guest-host polymer-dispersed liquid crystals may be used in the optical elements 36–42, in which a dye is mixed with the liquid crystal molecules, allowing the color of the material to change with applied voltage.

The MVD system 10 also has little to no contrast degradation due to ambient illumination of the MVD system 10, since the use of the real image projector 54 requires a housing extending to the MOE device 32, which in turn reduces the amount of ambient light reaching the MOE device 32, and thereby prevent contrast degradation.

Alternatively, contrast degradation can be reduced by increasing the illumination from the image projector 20 in proportion to the ambient illumination, and by installing an absorbing plastic enclosure around the MOE device 32 to reduce the image brightness to viewable levels. The ambient light must pass through the absorbing enclosure twice to reach the viewer 12—once on the way in and again after scattering off the optical elements 36–42 of the MOE device 32. On the contrary, the light from the image projector 20 which forms the images 44–50 only passes through the absorbing enclosure on the way to the viewer 12, and so had a reduced loss of illumination, which is a function of the square root of the loss suffered by the ambient light.

An alternative embodiment reduces the effects of ambient light is to use an enclosure with three narrow spectral bandpasses in the red, green and blue, and a high absorption for out-of-band light, which is highly effective to reduce such ambient light effects. Greater performance in view of ambient light is obtained by using laser light sources in the image projector 20, since the narrowband light from laser light sources passes unattenuated after scattering from the MOE device 32, while the broadband light from the ambient illumination is mostly absorbed.

ANTI-ALIASING IN THE MOE DEVICE

In another alternative embodiment, referring to FIG. 16 and as described herein, prior to transmission of the image data to the image projector 20 and thence to the optical elements 160–168 of the MOE device 32, the MVD controller 18 or alternatively the graphics data source 16 may perform 3D anti-aliasing on the image data to smooth the features to be displayed in the 3D image 34 on the optical elements 160–168. Using 3D anti-aliasing, the system 10 avoids imaging jagged lines or incomplete regions in depth, for example, between parallel planes 162–164 along the z-direction, due to display pixelization caused by the inherently discrete voxel construction of the MOE device 32 with the optical elements 160–168 aligned in x-y planes normal to a z-axis.

As the data corresponding to the image slices is generated, an image element 170 may appear near an edge of a plane transition, that is, between optical elements, for example, the optical elements 162–164. For illustrative purposes only, the configuration of the optical elements 160–168 and the voxel 170 therein shown in FIGS. 16–18 is exaggerated to more clearly describe and illustrate the disclosed anti-aliasing system and method, and so it is to be understood that the optical elements 160–168 may have relatively small spacings therebetween.

To avoid an abrupt transition at the specific image element 170 and in the 3D image composed of at least the voxel and/or image element 170, both of the slices as described herein illuminated on the optical elements 162–164 from the projector 20 may be generated such that each of the images 172–174 on the optical elements 162–164, respectively, includes the image element 170 or a portion or derivative form thereof, and so the image element 170 is shared between both planes formed by the optical elements 162–164, which softens the transition and allows the 3D image 34 in FIG. 1 to appear more continuous. The brightness of the image elements 172–174 on respective consecutive optical elements 162–164 is varied in accordance with the location of the image elements 172–174 in the image data.

Referring to FIG. 16, the number N of optical elements 160–168 may be planar LCD surfaces, and so may be labeled $P_1, P_2, P_3, \ldots P_N$, and span a distance D being the width of the MOE device 32. Accordingly, each of the optical elements 160–168 may be spaced at distances $D_1$, $D_2$, $D_3$, ... $D_N$ along the z-axis from a common reference point, such that $D_N-D_1=D$. For example, the common reference point may be the optical element 160 closest along the z-axis to the projector 20, so $D_1=0$ and $D_N=D$. Alternatively, the distances of the optical elements 160–168 may be measured from the lens 22 of the projector 20, so an offset distance $D_{OFFSET}$ from the optical element 160 and the lens 22 may be subtracted from absolute distances $D_1$, $D_2$, $D_3$, ... $D_N$ of the optical elements 160–168 from the lens 22 to obtain relative distances from the optical element 160. Accordingly, $D_1=D_{OFFSET}$. The optical elements 160–168 may also have a uniform spacing S therebetween, or alternatively the spacing between the optical elements 160–168 may vary.

As described herein, a depth value of each voxel 170 is measured along the z-axis from a reference point either at the lens 22 or at the optical element 160, and such depth values are stored in a depth buffer with an associated color value stored in a color buffer. For example, a depth value $D_V$ is associated with the voxel 170.

To perform anti-aliasing and thus to smooth the appearance of the voxel 170 lying between the optical elements 162–164, the distances $D_A$, $D_B$ between the depth value $D_V$ and the optical elements 162–164, respectively, are determined, and such distances are used to generate an anti-aliasing parameter. The anti-aliasing parameter is then used to generate two voxels 172–174 on the optical elements 162–164, respectively, with the corresponding color value of the voxel 170 being modified by the anti-aliasing parameter to generate respective color values for the two voxels 172–174.

FIG. 17 illustrates a voxel display without the use of anti-aliasing. As shown in FIG. 17, the voxels 176–178 on the optical element 162 and the voxels 180–184 on the optical element 164 form a sharp transition at the boundary defined by the voxels 178–180. If the distance between the optical elements 162–164 is significant, a noticeable jagged or broken appearance of the image 34 may be formed by the combination of displayed voxels 176–184. For example, the voxels 178–180 may have had depth values between the optical elements 162–164, for example, with the voxel 178 being closer to but not on the optical element 162 and the voxel 180 being closer to but not on the optical element 162. Such intermediate depth values may then have been converted to the discrete depth values $D_2$, $D_3$ of the optical elements 162–164, respectively, in order to display the voxels 178–180. Further, the color values of the voxels 178–180 in FIG. 17 are unchanged, and so the intensity of the color of the voxels 178–180 may appear anomalous for such differing optical depths. In the alternative, the voxels 178–180 at the transition may be omitted due to their intermediate depths, but then the 3D image 34 composed of the voxels 176 and 182–184 may appear to have holes or fractures.

Using anti-aliasing, as shown in FIG. 18, both transitional voxels 178–180 may be used to generated new voxels 178A–178B and 180A–180B, with the voxels 178A–180A displayed on the optical element 162 and the voxels 178B–180B displayed on the optical element 164. In addition, as shown in FIG. 18, while the color values of the voxels 176 and 182–184 are unchanged, by performing anti-aliasing, the color values of the new voxels may be modified such that each of the new voxels 178A–178B and 180A–180B has an adjusted color to soften the image transition in the x-y plane across different depths. Accordingly, as shown in FIG. 19, while the voxels 176–184 have an abrupt transition in apparent depth according to the curve 176 for the imaging in FIG. 17, the voxels 176, 178A–178B, 180A–180B, and 182–184 in FIG. 18 have a relatively smoother transition in apparent depth according to the curve 188. It is noted that, for illustrative purposes only, the curves 186–188 are not overlaid in FIG. 18 in order to clearly show the curves 186–188, and so it is to be understood that, in FIG. 18, the apparent depths of voxels 176 and 182–184 are identical with and without anti-aliasing.

In FIG. 19, the voxels 178A–178B of FIG. 18 form an image across the optical elements 162–164 with an apparent depth 178C intermediate between the depths of the voxels 178A–178B and corresponding to the original depth of the voxel 178 in FIG. 17 to be closer but not on the optical element 162. Similarly, the voxels 180A–180B of FIG. 18 form an image across the optical elements 162–164 with an apparent depth 180C intermediate between the depths of the voxels 180A–180B and corresponding to the original depth of the voxel 180 in FIG. 17 to be closer but not on the optical element 164.

It is to be understood that the anti-aliasing is not limited to the nearest two bounding optical elements, but instead the voxels 178–180 may be used to generate a plurality of corresponding voxels on a respective plurality of the optical elements 160–168, and so to provide depth transition curves which may be, for example, smoother than the curve 188 in FIG. 19. For example, the depth transition curve 188 due to anti-aliasing may approximate a sigmoid or tangent function.

Referring to FIG. 16, to perform anti-aliasing for the voxel 170, at least one depth adjustment value λ is generated which is a function of the distance of the voxel 170 from at least one optical element. In one embodiment, adjustment values λ, μ may be generated which are functions of scaled values of the distances $D_A$, $D_B$ from the respective optical elements 162–164. The adjustment values λ, μ are then used to modify a color value $C_V$ associated with the voxel 170 to generate new color values $C_A$, $C_B$ associated with the newly generated voxels 172–174, respectively, with the voxels 172–174 having respective x-y positions on the optical elements 162–164 identical to the x-y position of the voxel 170.

The color value of a voxel may specify at least the brightness of the voxel to be displayed. Alternatively, the voxel 170 may be associated with a set of parameters including at least one scalar specifying the brightness of the colorized voxel. Accordingly, modification of the color values may be performed through multiplication of the color value by an adjustment value. For example, for a color value $C_V=12$ brightness units and an adjustment value α=0.5, the modify color value $C_A$ is determined to be $C_V λ=(12$ brightness units$)\times(0.5)=6$ brightness units.

In one embodiment, the distance $D_V$ is scaled to be a depth value from 1 to N, in which N is the number of optical elements 160–168 and each of the integer values 1 to N corresponds to a specific one of the optical elements 160–168, for example, as indices for the labels $P_1$, $P_2$, $P_3$, ... $P_N$ shown in FIG. 16. The adjustment values λ, μ are determined from the scaled depth value. If the optical elements 160–168 are uniformly spaced with constant spacing S along the distance D, then:

$$S = \frac{D}{N-1} \qquad (1)$$

so a scaled distance of the voxel 170 is:

$$D_{SCALED} = \frac{D_V - D_{OFFSET}}{S} + 1 \quad (2)$$

in which $D_V$ is the absolute distance measured from the lens 22 or other reference points. For example, with the lens 22 being the origin of the z-axis, the optical element 160 may be at distance $D_1 = D_{OFFSET}$.

$D_{SCALED}$ is a real numbered value such that $1 \leq D_{SCALED} \leq N$, so the fractional portion of $D_{SCALED}$, which ranges between 0 and 1, indicates the relative distance from the optical elements 162–164. For the optical elements 162–164 bounding the voxel 170 on either side along the z-axis, the indices of the optical elements 162–164 are:

$$\lfloor D_{SCALED} \rfloor \text{ and} \quad (3)$$

$$\lfloor D_{SCALED} \rfloor + 1, \quad (4)$$

respectively, in which $\lfloor X \rfloor$ is the floor or integer function of a value or variable X; that is, a function returning the largest integer less than X.

The fractional portion of $D_{SCALED}$ is:

$$\lambda = D_{SCALED} - \lfloor D_{SCALED} \rfloor \quad (5)$$

and thus:

$$\mu = 1 - \lambda. \quad (6)$$

The color values $C_A$, $C_B$ indicating respective brightnesses associated with the voxels 172, 174, respectively, are assigned the values:

$$C_A := C_V(1-\lambda) \quad (7)$$

$$C_B := C_V \lambda = C_V(1-\mu). \quad (8)$$

in which the symbol ":=" indicates assignment of a new value.

For example, for a voxel 170 having a depth $D_V = 9.2$ units from the lens 22, with an offset $D_{OFFSET} = 3.0$ units, with the MOE device 32 having five evenly-spaced optical elements extending twenty units in length, N=5, D=20, then the spacing S=5 units, as per Equation (1), and $D_{SCALED} = 2.24$, accordingly to Equation (2). The voxel 170 is thus positioned between the optical elements having indices $\lfloor D_{SCALED} \rfloor = 2$ and $\lfloor D_{SCALED} \rfloor + 1 = 3$, as per Equations (3)–(4), and so in FIG. 16, the optical elements 162–164 having labels $P_2$ and $P_3$ are identified as the optical elements upon which new voxels 172–174 are to be displayed corresponding to the voxel 170.

In this example, from Equations (5)–(6), the fractional value of the scaled depth is $\lambda = 0.24$, and so $\mu = 0.76$. Accordingly, $(1-\lambda) = 0.76$ and $(1-\mu) = 0.24$, and from Equations (7)–(8), the color value of the voxel 172 is $C_A = 0.76$ $C_V = 76\%$ of the brightness of the original voxel 170, and the color value of the voxel 174 is $C_B = 0.24$ $C_V = 24\%$ of the brightness of the original voxel 170. Thus, since the voxel 170 is "closer" to the optical element 162 than the optical element 164, the corresponding new voxels 172–174 have a distributed brightness such that the closer optical element 162 displays the majority of the color between the two voxels 172–174, while the farther optical element 164 contributes a lesser but non-zero amount to the appearance at the transition of the 3D volumetric image between the optical elements 162–164 at the voxel 170.

For the voxels 170 having depth values lying precisely on optical elements 160–168, no anti-aliasing is required. Accordingly, Equations (2)–(4) degenerate to integer values, and Equations (5)–(6) result in the adjustment values $\lambda$, $\mu$ being 0 and 1, respectively, or being 1 and 0, respectively, so no adjustment of the color values is performed. To avoid unnecessary computation, the MVD controller 18 may check whether the computation in Equation (2) results in an integer, within a predetermined error tolerance such as 1 percent, and if so, the voxel 170 is determined or deemed to lie precisely on one of the optical elements 160–168. The anti-aliasing procedure is terminated for the currently-processed voxel 170, and the procedure may then continue to process other voxels of the 3D image 34.

In this embodiment using Equations (1)–(8), since uniform spacing and other characteristics of the MOE device 32 are known, no search for the nearest bounding optical elements is necessary, since the distance $D_V$ of the voxel 170 and the MOE device characteristics determine which optical elements bound the voxel 170, by Equations (3)–(4).

In another alternative embodiment, for optical elements 160–168 of an MOE device 32 having either uniform spacing, or having variable and/or non-uniform spacing, the anti-aliasing may be performed using Equations (9)–(13) set forth below in conjunction with Equations (7)–(8) above. For example, for MOE devices having variable spacing and/or variable offsets of the MOE device from the projector 20 and lens 22, the anti-aliasing method may be performed on-the-fly during modification of the spacing and configuration of the optical elements 160–168. Since the distances/depths of the optical elements 160–168 may vary, in the alternative embodiment, the anti-aliasing method determines at least the two optical elements bounding the voxel 170 currently being processed, by searching the depth values of each of the optical elements 160–168 for the two bounding optical elements having a distance/depth values $D_{NEAR1}$ and $D_{NEAR2}$ such that:

$$D_{NEAR1} \leq D_V \leq D_{NEAR2}. \quad (9)$$

The variables NEAR1 and NEAR2 may be integer indices specifying the associated optical elements from among the optical elements 160–168. For example, in FIG. 16, NEAR1=2 and NEAR2=3, corresponding to the optical elements 162–164 bounding the voxel 170 along the z-axis.

The depth adjustment values $\lambda$, $\mu$ are determined to be:

$$\lambda = \left| \frac{D_V - D_{NEAR1}}{D_{NEAR1} - D_{NEAR2}} \right| \quad (10)$$

$$\mu = \left| \frac{D_V - D_{NEAR2}}{D_{NEAR1} - D_{NEAR2}} \right| \quad (11)$$

in which $\lfloor X \rfloor$ is the absolute value or magnitude function of a value or variable X.

The depth adjustment values from Equations (10)–(11) are both positive real numbers which satisfy:

$$0 \leq \lambda, \mu \leq 1 \quad (12)$$

$$\lambda + \mu = 1 \quad (13)$$

and so the depth adjustment values scale the non-uniform and/or variable distances between optical elements, and are then used in Equations (7)–(8) to generate the voxels 172–174 with the corresponding adjusted color values. As shown in Equations (10)–(11), the depth adjustment values $\lambda$, $\mu$ are based on interpolations of the depth of the voxel 170 within the range of depths of the voxels 172–174 associated with the optical elements 162–164, respectively.

In the above example having uniform spacing, Equations (9)–(13) are applied to with $D_V=9.2$ units, $D_{NEAR1}=D_2=8$ units and $D_{NEAR2}=D_3=13$ units, so:

$$\lambda = \left|\frac{9.2-8}{8-13}\right| = \frac{1.2}{5} = .24$$

$$\mu = \left|\frac{9.2-13}{8-13}\right| = \frac{3.8}{5} = .76$$

which agrees with the adjustment values using Equations (1)–(8). The alternative embodiment is useful if the dimensional and spatial characteristics of the MOE device 32 and the optical elements 160–168 vary, but a search is required to determine the appropriate bounding optical elements 162–164 for generating the new voxels 172–174.

Figure 20:
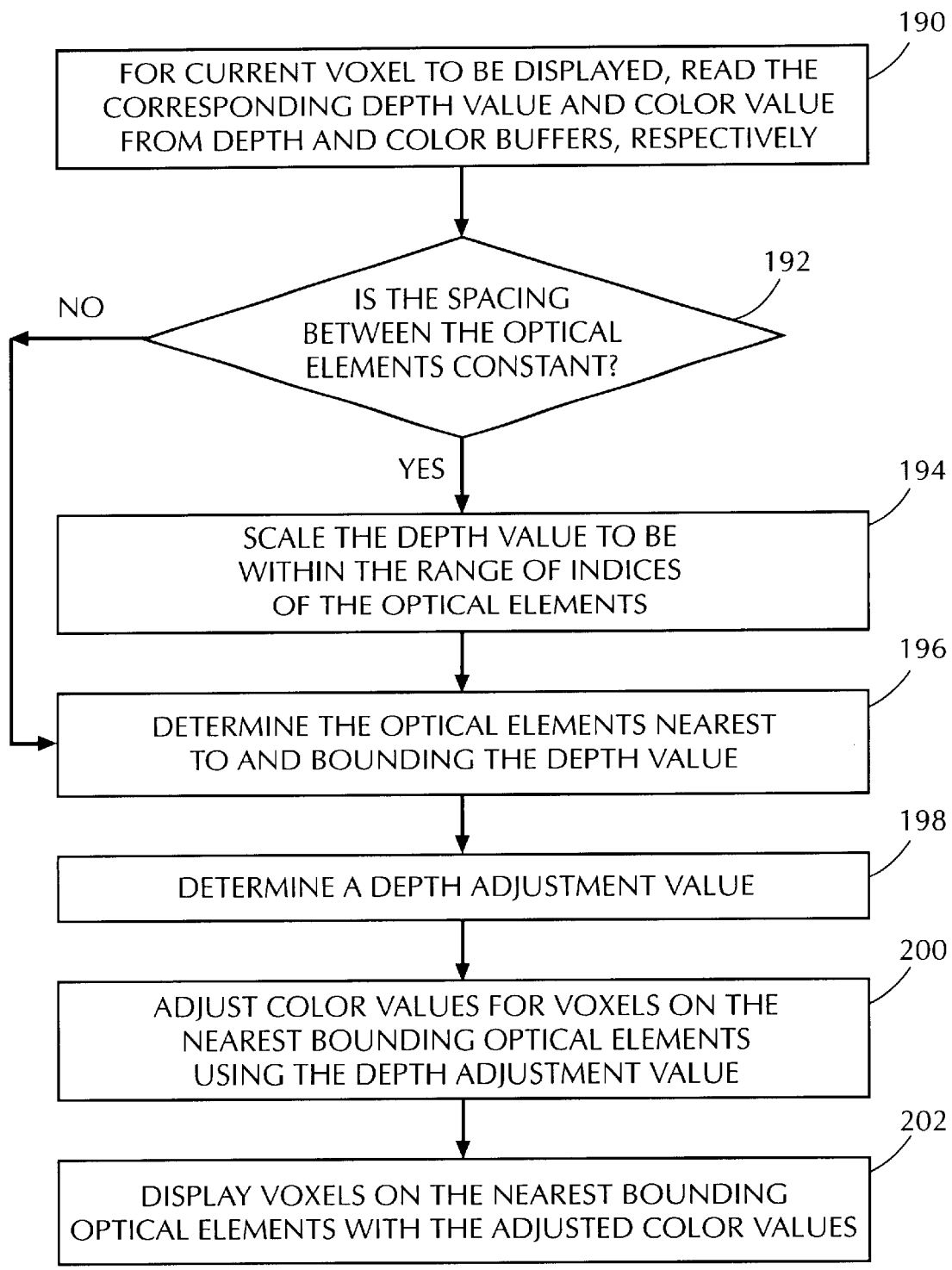
FIG. 20 illustrates a flowchart of a method implementing 3D anti-aliasing.

FIG. 20 illustrates a flowchart of a method implementing 3D anti-aliasing as described herein, in which, for a current voxel to be displayed, such as the voxel 170, the method reads the corresponding depth value $D_V$ and color value $C_V$ from depth and color buffers, respectively, in step 190. The method may then determine if the spacing between the optical elements constant in step 192; for example, a configuration setting of the MVD controller 18 may indicate if the optical elements 160–168 are fixed, having uniform or non-uniform distribution, and/or the MVD controller 18 and the MOE device 32 operate in a variable spacing mode, as described herein.

If the spacing is constant, the method then scales the depth value $D_V$ in step 194 to be within the range of indices of the optical elements 160–168 using Equations (1)–(2), and then the method determines the optical elements nearest to and bounding the depth value $D_V$ in step 196 using Equations (3)–(4) in step 196. Otherwise, if the spacing is not constant in step 192, the method may perform step 196 without step 194 in the alternative embodiment to determine the optical elements satisfying Equation (9); that is, using a search procedure through the distance/depth values of each of the optical elements 160–168. In another alternative method, the step 192 may be optionally implemented or omitted, depending on the configuration and operating mode of the MVD controller 18 and the MOE device 32.

The method then determines a depth adjustment value $\lambda$ and/or a second value 11 in step 198 using Equations (5)–(6) or Equations (10)–(11), depending on the embodiment implemented as described herein. The method then adjusts the color values in step 200 for voxels on the nearest bounding optical elements using the depth adjustment value or values using Equations (7)–(8), and the method displays the adjusted voxels in step 202 on the nearest bounding optical elements with the adjusted color values.

In another alternative embodiment, an intermediate degree of anti-aliasing may be implemented. For example, the adjustment values $\lambda, \mu$ may be fixed to the value of, for example, .5, such that half of the brightness of the voxel 170 is assigned to each of the voxels 172–174. Such intermediate anti-aliasing may generate apparent depths such as an intermediate depth 180D corresponding to intermediate transition curves such as shown by the curve 189 in FIG. 19.

In other alternative embodiments, the degree of anti-aliasing can be varied from one extreme; that is, ignoring the fractional depth values $\lambda, \mu$ to assign the color values; to another extreme of using all of the fractional depth values $\lambda, \mu$, or the degree of anti-aliasing can be varied to any value between such extremes. Such variable anti-aliasing may be performed by dividing the fractional portion $\lambda$ of the scaled depth by an anti-aliasing parameter P, and then negatively offsetting the resulting value from one. That is, after $\alpha$ is calculated in Equations (5) and (10), a variable value $\lambda_{VAR}$ is calculated such that:

$$\lambda_{VAR} = \frac{\lambda}{P}. \tag{14}$$

The final color value may be determined by fixing or clamping the negatively offset value to be within a predetermined range, such as between 0 and 1. Accordingly, Equations (7)–(8) are modified for variable anti-aliasing such that:

$$C_{A2}=C_V(1-\lambda_{VAR}) \tag{15}$$

$$C_{B2}=C_V\lambda_{VAR}. \tag{16}$$

The steps 198–202 in FIG. 20 may thus implement Equations (14)–(16), respectively, to provide variable anti-aliasing.

An anti-aliasing parameter of P=1 corresponds to full anti-aliasing, and an anti-aliasing parameter of infinity, P→∞, which may be implemented computationally with an arbitrary high numerical value, corresponds to no anti-aliasing. Anti-aliasing parameters less than 1 may also be implemented. For example, when P=1, anti-aliasing as described above for Equations (1)–(13) is implemented.

In another example, for an anti-aliasing value of $\lambda=0.24$ and an anti-aliasing parameter of 3, $\lambda_{VAR}=0.08$ by Equation (14) and so $C_{A2}=0.92C_V=92\%$ of the color value of the voxel 170, while $C_{B2}=0.08C_V=8\%$ of the color value of the voxel 170, as per Equations (15)–(16). Compared to the previous numerical example, such variable anti-aliasing increases the contribution of the voxel 172 in the apparent depth from 76% to 92%, while the voxel 174 has a decreased contribution, from 24% or about one-fourth, decreased to less than 10%. In a further example, for P→∞, anti-aliasing is eliminated, and so $\lambda_{VAR}=0.00$ by Equation (14). Thus, $C_{A2}=1.0C_V=100\%$ of the color value of the voxel 170, while $C_{B2}=0.0C_V=0\%$ of the color value of the voxel 170, as per Equations (15)–(16). Accordingly, any voxels 170 lying between the optical elements 162–164 are displayed on the closer optical element 162, without anti-aliasing, and so step 202 in FIG. 20 may further include the step of not generating and thus not displaying a second voxel farther from the reference point if P→∞. For example, the voxel 174 is not generated.

In further alternative embodiments using variable anti-aliasing, the method in FIG. 20 may include displaying new voxels only if the adjusted color values are greater than a predetermined threshold T. For example, if $C_V(1-\lambda_{VAR})>T$ then $C_{A2}=C_V(1-\lambda_{VAR})$ (17)

else $C_{A2}=0$ if $C_V\lambda_{VAR}>T$ then $C_{B2}=C_V\lambda_{VAR}$ (18)

else $C_{B2}=0$.

For example, T may equal 0.05, and so contributions of color less then about 5% may be considered negligible, for example, since voxels with such color values are displayed on the optical elements 160–168 when switched to opaque/scattering mode. Accordingly, such negligible contributions to the overall 3D image are discarded, and the non-contributing voxels are not displayed, which may reduce the number of voxels to be displayed and improve computational processing of the 3D image.

In additional alternative embodiments, the MVD system 10 is capable of generating the 3D image 34 having the appearance of translucency of portions of the 3D image 34. That is, the images 44–50 displayed on the optical elements 36–42 of the MOE device 32 have appropriate shading and colors such that a portion of one image may appear translucent, with another portion of a second image appearing to be viewable through the translucent portion. Such translucent appearances may be generated with or without anti-aliasing.

In generating the 3D image 34, the method employed by the MVD system 10 performs the MPD computation using, for example, OpenGL framebuffer data, such as the color and depth (or z) buffers of the frame buffer of the graphics data source 16. A value in the depth buffer is the depth of the corresponding pixel in the color buffer, and is used to determine the location of the pixel or voxel, such at the voxel 170 in FIG. 16, displayed within the MOE device 32. This MPD computation method is appropriate in situations in which it is desired that portions of the images of background objects of the volumetric image 34 from the MOE device 32 are not rendered if such images are occluded by images of foreground objects.

For generating images in the MOE device 32 in which the images of foreground objects are translucent to allow the image corresponding to an occluded background object to be seen, an alpha channel technique is used, in which a parameter $\alpha$ (alpha) determines the color of a pixel/voxel in the color buffer by combining the colors of both the foreground and background objects, depending on the value of a. Total opacity is given by $\alpha=1$, and total transparency is given by $\alpha=0$. While using such alpha channel imaging to generate color images from the color buffer that look correct, the depth values in the depth buffer may be unchanged, and so still correspond to the depths of the images of the foremost objects.

In known display systems, the unmodified depths prohibit the proper display of images in the volumetric display system since there may be multiple surfaces at a variety of depths which are to be displayed using only a single depth value. The disclosed MVD system 10 generates volumetric images 34 having, for example, translucent objects or portions thereof which avoids the prohibition in the prior art in displaying multiple surfaces at a variety of depths for a single depth value. The disclosed MVD system 10 uses additional features of OpenGL to generate clip planes located in the model space of the MVD system 10, with which rendering is only allowed to occur, for example, on a predetermined side of each clip plane, such as a positive side as opposed to a negative side.

For an MOE device 32 having N planes 204–212 which may be numbered with indices 1 to N and having a uniform spacing $\Delta$ therebetween, as shown in FIGS. 21–24, a scene such as a volumetric image 34 is rendered N times with the clip planes facing toward each other, separated by the distance $\Delta$ and centered on the location of a given MOE plane of the planes 204–212 in the model space. Thus, N different images are generated, and the corresponding color buffer is retrieved from the frame buffer to be sent to the MVD controller 18. Upon sending the color buffer to the MVD controller 18 for display in the MOE device 32, the alpha channel may be turned off since the MVD system 10 has an inherent alpha value associated with the MOE device which is being used to generate the 3D volumetric image 34.

Figure 22:
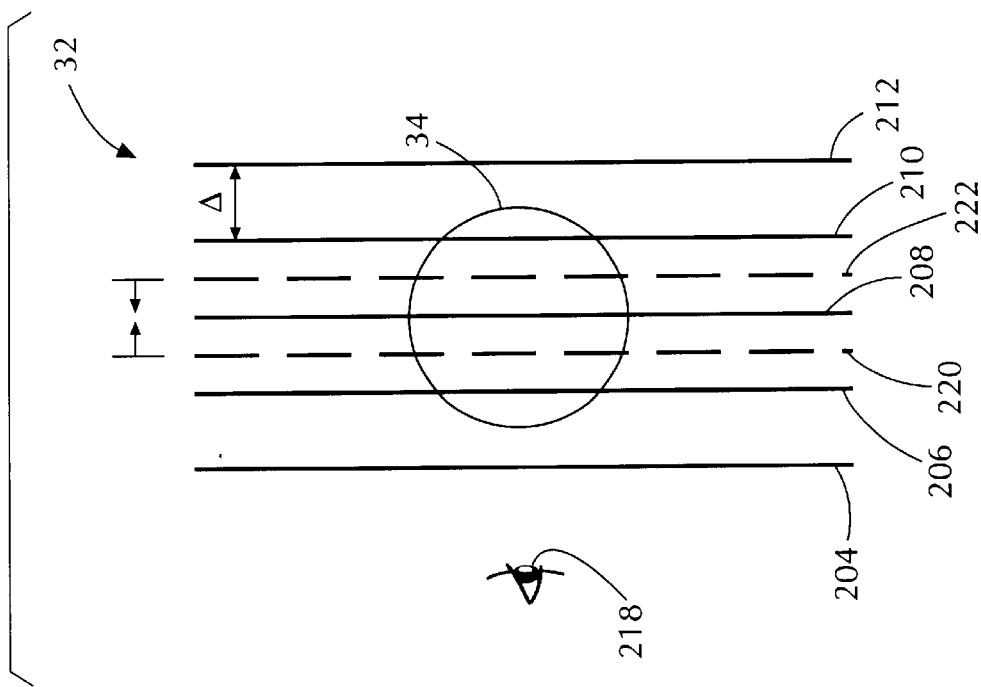
FIGS. 21–22 illustrate the generation of 3D images having translucent foreground objects without anti-aliasing.
Figure 21:
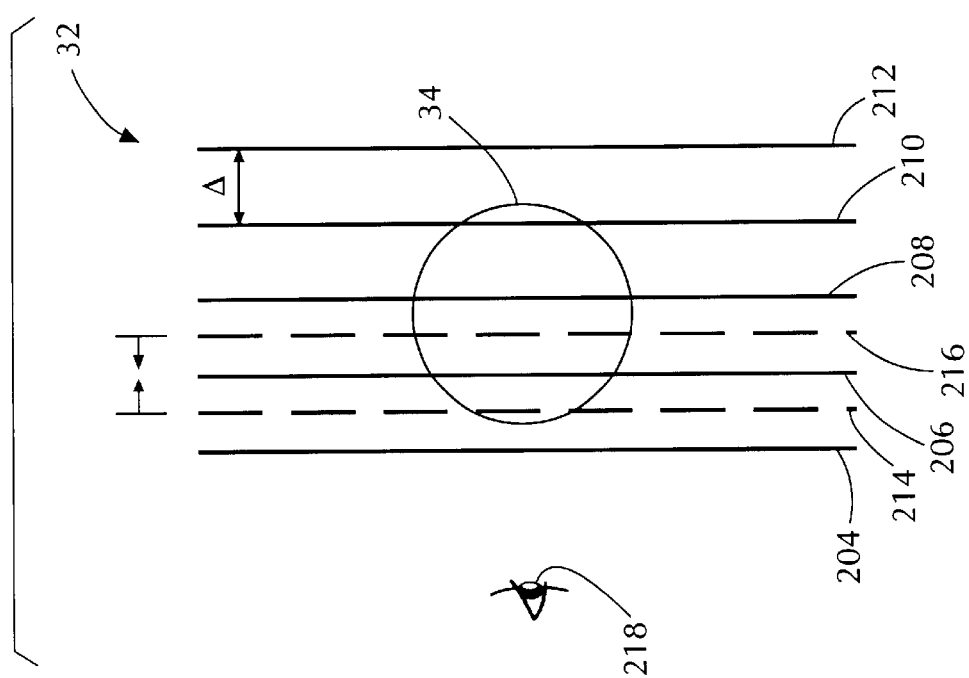

Rendering with clip planes may be implemented without anti-aliasing as shown in FIGS. 21–22, in which clip planes 214–216 are used corresponding to image portions positioned closer to an observer 218, and portions of the image 34 are generated and displayed on a first plane 206 positioned between the clip planes 214–216, with the image portions between the clip planes 214–216 displayed on the first plane 206. New portions of the image 34 are generated between the clip planes 220–222 for display on a second plane 208 farther from the observer 218 and positioned between the clip planes 220–222, with the image portions between the clip planes 220–222 displayed on the second plane 208.

To implement anti-aliasing with the above method using the alpha channel, other features of OpenGL are used, such as an atmospheric effect implementing fog-like imaging used for the anti-aliasing. The fog feature causes the color of each imaged object to be combined with the color of the fog in a ratio determined by the density of the fog and the depth of the model with respect to the depth range associated with far and near values specified for the fog.

Figure 24:
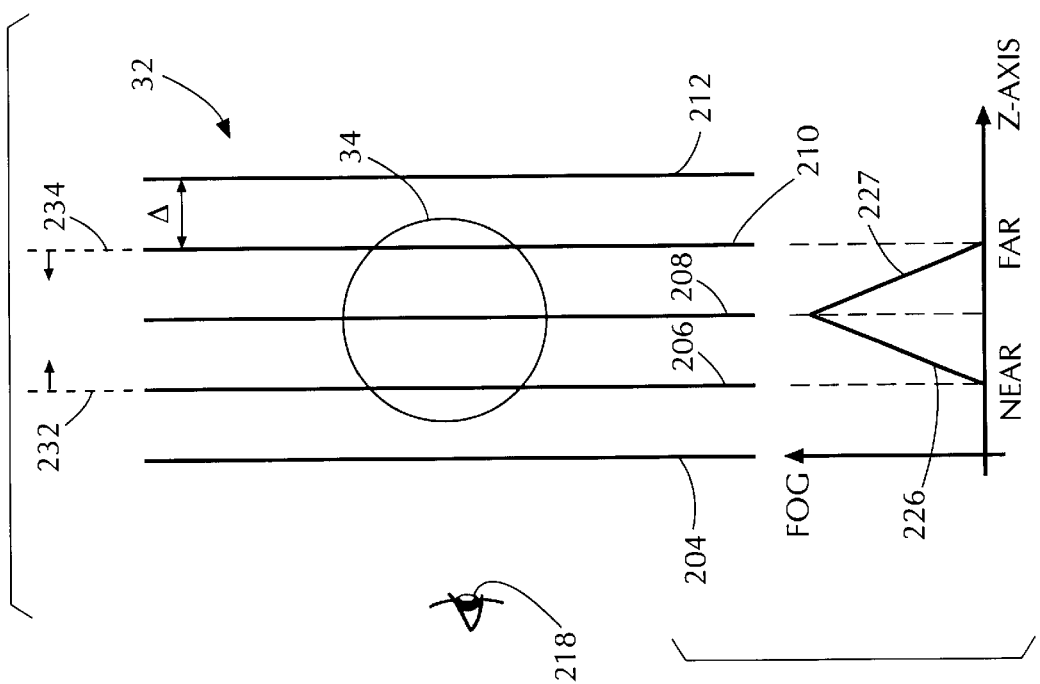
FIGS. 23–24 illustrate the generation of 3D images having translucent foreground objects with anti-aliasing.
Figure 23:
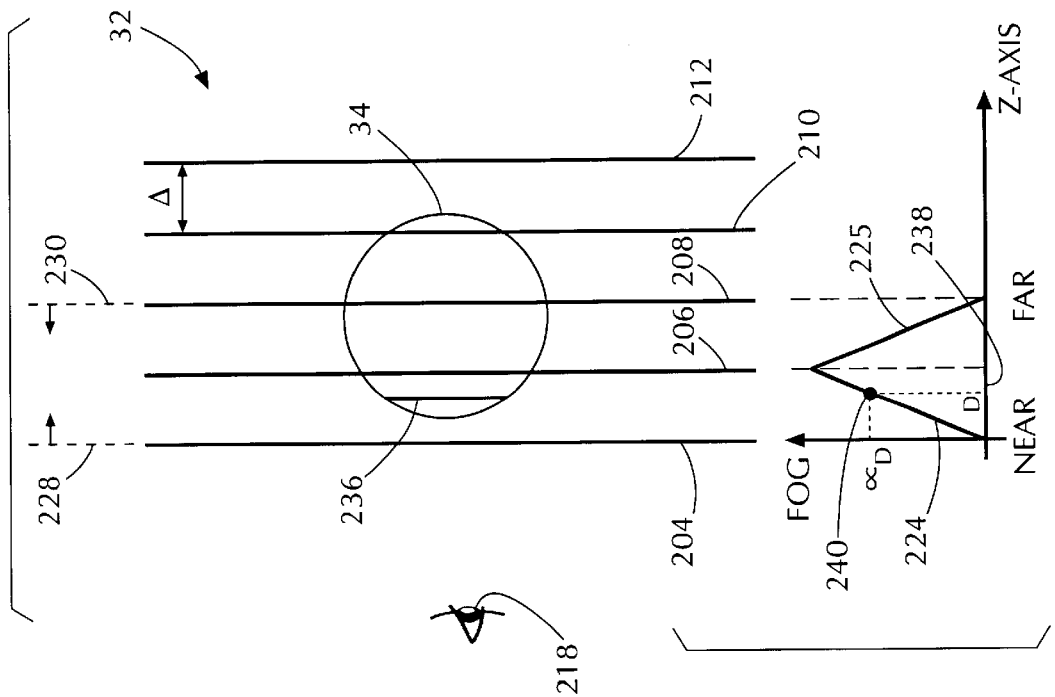

Fog functions available in OpenGL include linear, exponential, and exponential-squared functions. The disclosed MVD system 10 may use such functions, as well as combinations of such fog functions, such as the superpositions of linear fog functions 224–227 as shown in FIGS. 23–24. In an illustrative embodiment shown in FIGS. 23–24, each of the combinations of linear fog functions 224–227 starts with a value of zero, corresponding to a black setting, at the near depth of the fog, and progresses in a linear manner to a value of one, corresponding to a true-colors setting, at the distance (FAR−NEAR)/2 from the near depth location. The fog function then falls back to zero at the far depth of the fog. With such a fog function, and with the clip planes separated by a distance of $2\Delta$ with their center being positioned on a given MOE plane in the model space upon which the image 34 is to be displayed, the image 34 is rendered N times, and each time the data from the color buffer is sent to the corresponding plane of the MOE device 32.

In an illustrative embodiment, the combination of linear fog functions and the processing of voxel image data with such combinations are performed by synthesizing images for a given optical element, such as the plane 206 in FIG. 23, with at least two rendering passes. During a first pass, two clip planes are separated by the distance $\Delta$, with a first clip plane 228 positioned on an optical element 204 having images rendered thereon before the current optical element 206, and with the second clip plane positioned on the current optical element 206. The forward linear fog function 224, having distances increasing, with NEAR less than FAR, is then used with the aforesaid clip planes to render a first set of images for the optical element 206.

During a second pass, the two clip planes are separated by the distance $\Delta$, with a first clip plane positioned on the current optical element 206, and with the second clip plane 230 positioned on the optical element 208 to have images thereon rendered after the current optical element 206, and with the second clip plane positioned on the current optical element 206. The backward linear fog function 225, having distances increasing, with FAR less than NEAR, is then used with the aforesaid clip planes to render a second set of images for the optical element 206.

The two sets of images rendered with the different linear fog functions 224–225 are then added together by the MVD system 10 to be displayed on the optical element 206.

For rendering a first image on a first plane 206 as shown in FIG. 23, the fog functions 224–225 are centered about the first plane 206, and the images from the clip planes 228–230 and depths therebetween have their corresponding color values modified by the corresponding value of the fog functions 224–225 at the associated depths. After rendering the added images on the optical element 206 using the functions 224–225, the MVD system 10 proceeds to render a successive image on a second plane 208 as shown in FIG. 24, with the fog functions 226–227 being translated to be centered about the second plane 208. The images from the clip planes 232–234 and depths therebetween have their corresponding color values modified by the corresponding value of the fog function 226 at the associated depths. The MVD system 10 proceeds to successively move the fog function and to process corresponding clip planes for color adjustment of each respective image using the alpha channel method. In alternative embodiments, different fog function may be implemented for different planes 204–212, for example, to have higher fog densities at greater distances from the observer 218 to increase depth perceptive effects of the displayed 3D volumetric image 34.

For example, referring to FIG. 23, for the images 236 at a depth 238 labeled D and having respective color values $C_i$ for each portion of the image, the value 240 of the fog function 224 at the depth D is $\alpha_D$, so the adjusted color value displayed for the images 236 is $\alpha_D C_i$. The color values $C_i$ may be the depth adjusted color values as in Equations (7)–(8) and/or (15)–(18) as described herein, and so the alpha channel adjustments may be optionally implemented in step 200 of FIG. 20 to perform the anti-aliasing with the alpha channel techniques described herein.

By the foregoing a novel and unobvious multi-planar volumetric display system 10 and method of operation has been disclosed by way of the preferred embodiment. However, numerous modifications and substitutions may be had without departing from the spirit of the invention. For example, while the preferred embodiment discusses using planar optical elements such as flat panel liquid crystal displays, it is wholly within the preview of the invention to contemplate curved optical elements in the manner as set forth above.

The MVD system 10 may be implemented using the apparatus and methods described in co-pending U.S. provisional patent appln. Ser. No. 60/082,442, filed Apr. 20, 1998, as well as using the apparatus and methods described in co-pending U.S. patent application Ser. No. 08/743,483, filed Nov. 4, 1996, which is a continuation-in-part of U.S. Pat. No. 5,572,375; which is a division of U.S. Pat. No. 5,090,789. The MVD system 10 may also be implemented using the apparatus and methods described in co-pending U.S. application Ser. No. 09/004,722, filed Jan. 8, 1998. Each of the above provisional and non-provisional patent applications and issued patents, respectively, are incorporated herein by reference. Accordingly, the invention has been described by way of illustration rather than limitation.

What is claimed is:

1. A method for performing anti-aliasing of a first voxel of a three-dimensional image displayed on a plurality of optical elements, wherein a first voxel depth value of the first voxel is between a pair of optical element depth values corresponding to a pair of optical elements bounding the first voxel, the method comprising the steps of:
   generating a depth adjustment value from the first voxel depth value;
   adjusting a first color value associated with the first voxel using the depth adjustment value; and
   displaying a second voxel on at least one of the pair of optical elements using the adjusted color value.

2. The method of claim 1, further comprising the step of:
   scaling the first voxel depth value to be within a predetermined range of indices associated with the plurality of optical elements; and
   wherein the step of generating the depth adjustment value includes the step of generating the depth adjustment value from the scaled voxel depth value.

3. The method of claim 2, wherein the step of generating the depth adjustment value includes the step of:
   determining a fractional portion of the scaled voxel depth value to be the depth adjustment value.

4. The method of claim 3, wherein the step of adjusting the first color value includes the step of:
   multiplying the first color value by a function of the fractional portion to generate a second color value as the adjusted color value, with the second color value being associated with the second voxel.

5. The method of claim 1, further including the step of:
   modifying the depth adjustment value with an anti-aliasing parameter to control the degree of anti-aliasing of the three-dimensional image.

6. The method of claim 1, wherein the step of adjusting the first color value includes the step of generating second and third color values from the first color value using the depth adjustment value; and
   wherein the step of displaying the second voxel includes the step of:
   displaying the second voxel and a third voxel on a respective one of the pair of optical elements using the second and third color values, respectively.

7. The method of claim 6, wherein the plurality of optical elements are uniformly spaced.

8. The method of claim 6, wherein the plurality of optical elements are not uniformly spaced.

9. The method of claim 6, wherein the plurality of optical elements have variable spacings therebetween.

10. The method of claim 9, further comprising
    searching through a plurality of depth values associated with the plurality of optical elements to determine a pair of optical elements wherein the first voxel depth value is between the depth values associated with the pair of optical elements.

11. The method of claim 6, wherein the step of generating the depth adjustment value includes the step of:
    generating the depth adjustment value from the first voxel depth value and the optical element depth values associated with the voxel and the pair of optical elements, respectively.

12. The method of claim 11, wherein the depth adjustment value $\lambda$ is calculated according to:

$$\lambda = \left| \frac{D_V - D_{NEAR1}}{D_{NEAR1} - D_{NEAR2}} \right|,$$

where $D_V$ represents the first voxel depth value, and $D_{NEAR1}$ and $D_{NEAR2}$ represent optical element depth values that satisfy the condition $D_{NEAR1} \leq D_V \leq D_{NEAR2}$.

13. The method of claim 1, wherein said depth adjustment value is generated according to a function provided by software that is used to render images having a three-dimensional appearance on a two-dimensional display.

14. The method of claim 13, wherein said software comprises the OpenGL application programming interface and said function comprises a fog function provided therein.

15. The method of claim 14, wherein said function comprises a combination of said fog functions.

16. A system for generating volumetric three-dimensional images, the system comprising:
    a multi-surface optical device including a plurality of individual optical elements; and a controller for anti-aliasing of image data including voxels having depth values between the depth values of the optical elements to generate image slices having processed voxels with adjusted color values; and an image projector for selectively projecting the image slices on respective optical elements of the multi-surface optical device to generate a volumetric three-dimensional image.

17. The system of claim 16, further comprising:

a floating-image generator for projecting the first volumetric three-dimensional image from the multi-surface optical device to generate a second volumetric three-dimensional image viewable as floating in space at a location separate from the multi-surface optical device.

18. The system of claim 16, wherein each of the plurality of individual optical elements of the multi-surface optical device includes a liquid crystal element having a controllable variable translucency to receive the anti-aliased images.

19. The system of claim 18, further comprising:

an optical element controller for controlling the translucency of the liquid crystal elements wherein:

a single liquid crystal element is controlled to have an opaque light-scattering state to receive and display the respective one of the set of anti-aliased images from the image projector; and the remaining liquid crystal elements are controlled to be substantially transparent to allow the viewing of the displayed image on the opaque liquid crystal element.

20. A method for generating a volumetric three-dimensional image having a smoothed depth appearance on a plurality of optical elements having depth values associated with depth values of said image, comprising the steps of:

providing image data representative of said three-dimensional image, including voxels thereof having depth values that do not correspond to the depth values of the plurality of the optical elements;

anti-aliasing said image data by processing said voxels to produce anti-aliased image data; and selectively projecting slices of the anti-aliased image data including said processed voxels onto the plurality of optical elements to generate said volumetric three-dimensional image.

21. The method of claim 20, wherein said voxels are processed to generate depth adjustment values for one or more of said voxels.

22. The method of claim 21, wherein the depth adjustment value for each one or more of said voxels is generated as a function of the distance of said voxel from at least one of the optical elements.

23. The method of claim 22, wherein the depth adjustment value $\lambda$ is calculated according to:

$$\lambda = \left| \frac{D_V - D_{NEAR1}}{D_{NEAR1} - D_{NEAR2}} \right|,$$

where $D_V$ represents the voxel depth value, and $D_{NEAR1}$ and $D_{NEAR2}$ represent optical element depth values that satisfy the condition $D_{NEAR1} \leq D_V \leq D_{NEAR2}$.

24. The method of claim 21, wherein the depth adjustment value of a voxel is used to modify its color value to generate one or more processed voxels each having a modified color value for selective projection on at least one of the optical elements.

25. The method of claim 24, wherein one of the modified color values is obtained by multiplying the color value of the voxel by its depth adjustment value $\lambda$.

26. The method of claim 24, wherein one of the modified color values is obtained by multiplying the color value of the voxel by the quantity $(1-\lambda)$.

27. The method of claim 24, wherein the color value specifies at least the brightness of a voxel.

28. The method of claim 24, wherein the depth adjustment value is divided by an anti-aliasing parameter P to control the degree of anti-aliasing.

29. The method of claim 28, wherein the modified color value of at least one of said processed voxels is determined by multiplying the color value of said voxel by $\lambda/P$.

30. The method of claim 28, wherein the modified color value of at least one of said processed voxels is determined by multiplying the color value of said voxel by $(1-\lambda/P)$.

31. The method of claims 29 or 30 wherein said one or more processed voxels are selectively projected only if their modified color values exceed a predetermined threshold.

32. The method of claim 20, further comprising the step of projecting the anti-aliased volumetric three-dimensional image formed on the plurality of optical elements to generate a second volumetric three-dimensional image viewable as floating in space at a location separate from the plurality of optical elements.

33. The method of claim 20, further comprising the step of controlling the translucency of each of the plurality of individual optical elements using an optical element controller to respectively receive and display the selectively projected processed voxels.

34. The method of claim 33, wherein the controlling step comprises the steps of:

causing a single optical element to have an opaque light-scattering state to receive and display the selectively projected processed voxels; and causing the remaining optical elements to allow the selectively projected processed voxels to be transparent.

35. The method of claim 33, wherein the optical elements comprise liquid crystal elements.

36. The method of claim 22, wherein said depth adjustment value is generated according to a function provided by software that is used to render images having a three-dimensional appearance on a two-dimensional display.

37. The method of claim 36, wherein said software comprises the OpenGL application programming interface and said function comprises a fog function provided therein.

38. The method of claim 37, wherein said function comprises a combination of said fog functions.

* * * * *

UNITED STATES PATENT AND TRADEMARK OFFICE
CERTIFICATE OF CORRECTION

PATENT NO. : 6,377,229 B1
DATED : April 23, 2002
INVENTOR(S) : Alan Sullivan

It is certified that error appears in the above-identified patent and that said Letters Patent is hereby corrected as shown below:

Column 1,
Line 5, insert -- This invention was made with Government support under contract DAMD17-97-C-7042 awarded by the Defense Administration Research Projects Administration (DARPA). The Government has certain rights to the invention. --

Signed and Sealed this

Eleventh Day of June, 2002

*Attest:*

*Attesting Officer*

JAMES E. ROGAN
*Director of the United States Patent and Trademark Office*